United States Patent
Gu et al.

(10) Patent No.: US 11,122,209 B2
(45) Date of Patent: Sep. 14, 2021

(54) THREE-DIMENSIONAL SHAPE ESTIMATION METHOD, THREE-DIMENSIONAL SHAPE ESTIMATION SYSTEM, FLYING OBJECT, PROGRAM AND RECORDING MEDIUM

(71) Applicant: SZ DJI TECHNOLOGY CO., LTD., Shenzhen (CN)

(72) Inventors: Lei Gu, Tokyo (JP); Yukiyoshi Sasao, Tokyo (JP); Zongyao Qu, Tokyo (JP); Tao Wu, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 65 days.

(21) Appl. No.: 16/387,103

(22) Filed: Apr. 17, 2019

(65) Prior Publication Data
US 2019/0253635 A1  Aug. 15, 2019

Related U.S. Application Data

(63) Continuation of application No. PCT/JP2016/080751, filed on Oct. 17, 2016.

(51) Int. Cl.
*H04N 5/232* (2006.01)
*G06T 7/593* (2017.01)
(Continued)

(52) U.S. Cl.
CPC ......... *H04N 5/23299* (2018.08); *G01C 11/06* (2013.01); *G05D 1/0088* (2013.01);
(Continued)

(58) Field of Classification Search
CPC ...... G01C 23/005; G01C 21/20; G01C 11/06; B64C 2201/122; B64C 39/024;
(Continued)

(56) References Cited

U.S. PATENT DOCUMENTS 6,249,600 B1 * 6/2001 Reed ................. G06T 17/00
345/420
6,653,970 B1 * 11/2003 Mitra ................. G01S 13/9058
342/22
(Continued)

FOREIGN PATENT DOCUMENTS

JP  2006003280 A  1/2006
JP  2010061216 A  3/2010
(Continued)

OTHER PUBLICATIONS

Li et al, "An Effective Method for Complete Visual Coverage Path Planning", 2010 Third International Joint Conference on Computational Science and Optimization, pp. 497-500 (Year: 2010).*
(Continued)

*Primary Examiner* — David E Harvey
(74) *Attorney, Agent, or Firm* — Anova Law Group, PLLC

(57) ABSTRACT

A three-dimensional shape estimation method includes generating a set of three-dimensional shape data for a flight range of a movable object based on a plurality of first images captured by a movable object, detecting a loss area based on the set of three-dimensional shape data for the flight range, generating a flight route for imaging the loss area, acquiring a plurality of second images that are captured in a horizontal direction toward the loss area with imaging ranges partially overlapped while the movable object moves along the flight route, and generating three-dimensional shape data for the loss area based on the plurality of second images.

10 Claims, 18 Drawing Sheets

(51) Int. Cl.
  *G06T 7/00* (2017.01)
  *G01C 11/06* (2006.01)
  *G05D 1/00* (2006.01)
  *G05D 1/10* (2006.01)
(52) U.S. Cl.
  CPC ........... *G05D 1/0094* (2013.01); *G05D 1/106* (2019.05); *G06T 7/0002* (2013.01); *G06T 7/593* (2017.01); *G06T 2207/10032* (2013.01); *G06T 2207/30168* (2013.01); *G06T 2207/30181* (2013.01)
(58) Field of Classification Search
  CPC ........ B64C 2201/127; B64C 2201/141; B64C 2201/146; B64C 2201/123; B64C 2201/14; B64C 2201/024; G06T 7/55; G06T 2207/10032; G06T 7/593; G06T 7/0002; G05D 1/0094; G05D 1/106; G05D 1/0088; G08G 5/0034; G08G 5/0069; G08G 5/0086
  See application file for complete search history.

(56) References Cited

U.S. PATENT DOCUMENTS

| | | | | |
|---|---|---|---|---|
| 8,463,024 | B1* | 6/2013 | Gallup | G06T 7/596 382/154 |
| 9,508,263 | B1* | 11/2016 | Teng | G08G 5/006 |
| 9,639,960 | B1* | 5/2017 | Loveland | G06T 7/0004 |
| 9,823,658 | B1* | 11/2017 | Loveland | B64D 47/08 |
| 10,288,430 | B2* | 5/2019 | Hillier | G05D 1/0808 |
| 10,429,834 | B2* | 10/2019 | Sabato | G06F 3/04817 |
| 10,650,583 | B2* | 5/2020 | Komeichi | G06T 5/50 |
| 10,872,534 | B2* | 12/2020 | Clark | B64C 39/024 |
| 2007/0237420 | A1* | 10/2007 | Steedly | G06T 3/4038 382/284 |
| 2010/0100269 | A1* | 4/2010 | Ekhaguere | G08G 5/006 701/26 |
| 2011/0033110 | A1* | 2/2011 | Shimamura | G06T 7/149 382/173 |
| 2013/0317667 | A1* | 11/2013 | Kruglick | G06T 17/10 701/2 |
| 2014/0316616 | A1* | 10/2014 | Kugelmass | G06T 11/206 701/8 |
| 2015/0054826 | A1* | 2/2015 | Varga | G09B 9/003 345/421 |
| 2015/0243073 | A1* | 8/2015 | Chen | G06T 17/20 345/419 |
| 2015/0336671 | A1* | 11/2015 | Winn | G05D 1/0094 701/3 |
| 2016/0150142 | A1* | 5/2016 | Lapstun | G03B 15/00 348/36 |
| 2016/0202695 | A1* | 7/2016 | Deroos | G05D 1/0202 701/2 |
| 2016/0328979 | A1* | 11/2016 | Postrel | H04W 4/46 |
| 2016/0357192 | A1* | 12/2016 | McGrew | B64D 47/08 |
| 2017/0041557 | A1* | 2/2017 | Urich | G11B 27/036 |
| 2017/0146344 | A1* | 5/2017 | Clark | G05D 1/0094 |
| 2017/0336806 | A1* | 11/2017 | Blanc-Paques | G08G 5/045 |
| 2017/0337824 | A1* | 11/2017 | Chen | G05D 1/0094 |
| 2017/0345317 | A1* | 11/2017 | Heinonen | G01C 21/20 |
| 2018/0099744 | A1* | 4/2018 | Bockem | G01S 17/933 |
| 2018/0218533 | A1* | 8/2018 | Millin | G01C 11/34 |
| 2018/0336409 | A1* | 11/2018 | Schultz | G08G 5/0039 |
| 2018/0362158 | A1* | 12/2018 | Zhang | G05D 1/0061 |
| 2019/0042829 | A1* | 2/2019 | Loveland | G09B 29/006 |
| 2019/0172359 | A1* | 6/2019 | Argo | G08G 5/0034 |
| 2019/0258277 | A1* | 8/2019 | Qian | B64C 39/024 |

FOREIGN PATENT DOCUMENTS

| | | |
|---|---|---|
| JP | 2015145784 A | 8/2015 |
| JP | 2016085100 A | 5/2016 |

OTHER PUBLICATIONS

World Intellectual Property Organization (WIPO) International Search Report and Written Opinion for PCT/JP2016/080751 dated Jan. 10, 2017 5 Pages.

* cited by examiner

THREE-DIMENSIONAL SHAPE ESTIMATION METHOD, THREE-DIMENSIONAL SHAPE ESTIMATION SYSTEM, FLYING OBJECT, PROGRAM AND RECORDING MEDIUM

CROSS-REFERENCE TO RELATED APPLICATION

This application is a continuation of International Application No. PCT/JP2016/080751, filed on Oct. 17, 2016, the entire content of which is incorporated herein by reference.

Claims, description, drawings, and abstract include matters subject to copyright protection. The copyright holder does not object to copying by any person of these documents, as long as the documents are shown as in the file or record of the Patent Office. However, in all other cases, all copyrights are reserved.

TECHNICAL FIELD

The present disclosure relates to a three-dimensional shape estimation method, a three-dimensional shape estimation system, a flying object, a program and a recording medium.

BACKGROUND ART

There has been known a platform (unmanned aerial vehicle) that performs imaging while passing a preset fixed route. The platform receives an imaging instruction from a ground base and images an image target. When imaging the image target, the platform inclines imaging device thereof to image according to a positional relationship between the platform and the imaging target while flying through the fixed route.

Patent Document

Patent Document 1: JP-A-2010-61216

SUMMARY OF DISCLOSURE

Problems to be Solved by the Disclosure

In the platform described in Patent Document 1, images are taken while passing through the fixed route, but the existence of an object (for example, a building) positioned in a vertical direction from the fixed route is not sufficiently considered. For this reason, it is difficult to sufficiently acquire an image of a lateral surface of the object or an image of another part of the object hidden by one part of the object which is observable from the sky. Therefore, the image for estimating a three-dimensional shape is insufficient, and the estimation accuracy of the three-dimensional shape is lowered.

In a case of imaging the lateral surface of the object, it is conceivable that the photographer grips an imaging device and images the lateral surface of the object. In this case, since the user needs to move to the periphery of the object, the convenience of the user is reduced. In addition, since the image is taken manually by the user, there is a possibility that the image of a desired state (for example, a desired imaging position of the object, a desired imaging size of the object, a desired imaging orientation of the object) can not be sufficiently acquired.

In addition, in a case of imaging a lateral surface of a specific object with an unmanned aerial vehicle, it is conceivable to decide a flight route of the unmanned aerial vehicle. In a case where a desired position around the object is designated as the imaging position, it is conceivable to designate the position of the three-dimensional space (latitude, longitude, altitude) by user input. In this case, since each imaging position is decided by user input, the convenience of the user is reduced.

Means for Solving Problems

A three-dimensional shape estimation method according to one aspect is a three-dimensional shape estimation method for estimating, a three-dimensional shape based on images captured by a flying object, comprising the steps of: generating, based on a plurality of first images, first three-dimensional shape data in a flight range of the flying object; detecting, based on the first three-dimensional shape data, a loss area; generating a first flight route for imaging the loss area; imaging a plurality of imaging ranges which are overlapped partially, in a horizontal direction toward the loss area in the first flight route to acquire a plurality of second images; and generating, based on the plurality of second images, three-dimensional shape data in the loss area.

The three-dimensional shape estimation method may further include the steps of: generating a second flight route for imaging by the flying object in the flight range of the flying object; and imaging a plurality of imaging ranges which are overlapped partially, in the second flight route to acquire the plurality of first images.

The second flight route may be a flight route for imaging by the flying object in a vertical direction in the flight range of the flying object. The first images may be images acquired by imaging in the vertical direction while imaging ranges are partially overlapped in the second flight route.

The first flight route may be a flight route for imaging the loss area at different altitudes. The second images may be images acquired by imaging in the horizontal direction toward the loss area at different altitudes while imaging ranges are partially overlapped in the first flight route.

The three-dimensional shape estimation method may further include the steps of: generating, based on position information of the loss area, a third flight route by inserting the first flight route into the second flight route; capturing a plurality of images by the flying object in the vertical direction and the horizontal direction of the loss area in the third flight route to acquire the plurality of first images and the plurality of second images; and generating, based on the first images and the second images, second three-dimensional shape data in the flight range.

The three-dimensional shape estimation method may further include the steps of: the flying object flying through the third flight route after flying through the second flight route; imaging at a first imaging position interval on the second flight route; and imaging at a second imaging position interval which is shorter than the first imaging position interval on the third flight route.

The three-dimensional shape estimation method may further include a step of synthesizing the first three-dimensional shape data in the flight range and the three-dimensional shape data in the loss area to generate third three-dimensional shape data in the flight range.

A three-dimensional shape estimation method according to one aspect is a three-dimensional shape estimation method for estimating a three-dimensional shape based on images captured by a flying object, comprising the steps of:

generating, based on a plurality of first images during flight of the flying object, first three-dimensional shape data in a flight range of the flying object; determining, based on the first three-dimensional shape data during the flight, whether there is a loss area; moving the flying object toward the loss area in a case where it is determined that there is a loss area; generating a first flight route for imaging the loss area during the flight; imaging a plurality of imaging ranges which are overlapped partially, in a horizontal direction toward the loss area in the first flight route to acquire a plurality of second images; and generating, based on the plurality of second images, three-dimensional shape data in the loss area.

The three-dimensional shape estimation method may further include the steps of: generating a second flight route for imaging by the flying object in the flight range of the flying object; and imaging a plurality of imaging ranges which are overlapped partially, in the second flight route to acquire the plurality of first images.

The second flight route may be a flight route for imaging by the flying object in a vertical direction in the flight range of the flying object. The first images may be images acquired by imaging in the vertical direction while imaging ranges are partially overlapped in the second flight route.

The first flight route may be a flight route for imaging the loss area at different altitudes. The second images may be images acquired by imaging in the horizontal direction toward the loss area at different altitudes while imaging ranges are partially overlapped in the first flight route.

The three-dimensional shape estimation method may further include a step of returning the flying object to the flight following the second flight route after acquisition of the second images.

The three-dimensional shape estimation method may further include a step of acquiring the first images at an imaging position where an image has not been captured in the second flight route.

The three-dimensional shape estimation method may further include a step of synthesizing the first three-dimensional shape data in the flight range and the three-dimensional shape data in the loss area to generate fourth three-dimensional shape data in the flight range during the flight.

A three-dimensional shape estimation system according to one aspect is a three-dimensional shape estimation system for estimating a three-dimensional shape based on images captured by a flying object, comprising: a shape data generating unit that generates, based on a plurality of first images, first three-dimensional shape data in a flight range of the flying object; a detection unit that detects, based on the first three-dimensional shape data, a loss area; a route generation unit that generates a first flight route for imaging the loss area; and an imaging unit that images a plurality of imaging ranges which are overlapped partially, in a horizontal direction toward the loss area in the first flight route to acquire a plurality of second images, wherein the shape data generating unit generates, based on the plurality of second images, three-dimensional shape data in the loss area.

The route generation unit may generate a second flight route for imaging by the flying object in the flight range of the flying object. The imaging unit may image a plurality of imaging ranges which are overlapped partially, in the second flight route to acquire the plurality of first images.

The route generation unit may generate the second flight route for imaging by the flying object in the vertical direction in the flight range of the flying object. The imaging unit may image a plurality of imaging ranges which are overlapped partially, in the vertical direction in the second flight route to acquire the plurality of first images.

The route generation unit may generate the first flight route for imaging the loss area at different altitudes. The imaging unit may image a plurality of imaging ranges which are overlapped partially, in the horizontal direction toward the loss area at different altitudes in the first flight route to acquire the plurality of second images.

The route generation unit may generate, based on position information of the loss area, a third flight route by inserting the first flight route into the second flight route. The imaging unit may capture a plurality of images in the vertical direction and the horizontal direction of the loss area in the third flight route to acquire the plurality of first images and the plurality of second images. The shape data generating unit may generate, based on the first images and the second images, second three-dimensional shape data in the flight range.

The three-dimensional shape estimation system may further include a flight control unit. The flight control unit may cause the flying object to fly through the third flight route after flying through the second flight route. The imaging unit may image at a first imaging position interval on the second flight route, and image at a second imaging position interval which is shorter than the first imaging position interval on the third flight route.

The shape data generating unit may synthesize the first three-dimensional shape data in the flight range and the three-dimensional shape data in the loss area to generate third three-dimensional shape data in the flight range.

A three-dimensional shape estimation system according to one aspect is a three-dimensional shape estimation system for estimating a three-dimensional shape based on images captured by a flying object, comprising: a flight control unit that controls a flight of the flying object; a shape data generating unit that generates, based on a plurality of first images during the flight of the flying object, first three-dimensional shape data in a flight range of the flying object; a detection unit that determines whether there is a loss area based on the first three-dimensional shape data during the flight; a route generation unit that generates a first flight route for imaging the loss area during the flight; and an imaging unit that images a plurality of imaging ranges which are overlapped partially, in a horizontal direction toward the loss area in the first flight route to acquire a plurality of second images, wherein the flight control unit moves the flying object toward the loss area in a case where it is determined that there is a loss area, and the shape data generating unit generates, based on the plurality of second images, three-dimensional shape data in the loss area.

The route generation unit may generate a second flight route for imaging by the flying object in the flight range of the flying object. The imaging unit may image a plurality of imaging ranges which are overlapped partially, in the second flight route to acquire the plurality of first images.

The route generation unit may generate the second flight route for imaging by the flying object in the vertical direction in the flight range of the flying object. The imaging unit may image a plurality of imaging ranges which are overlapped partially, in the vertical direction in the second flight route to acquire the plurality of first images.

The route generation unit may generate the first flight route for imaging the loss area at different altitudes. The imaging unit may image a plurality of imaging ranges which are overlapped partially, in the horizontal direction toward the loss area at different altitudes in the first flight route to acquire the plurality of second images.

The flight control unit may return the flying object to the flight following the second flight route after acquisition of the second images.

The imaging unit may acquire the first images at an imaging position where an image has not been captured in the second flight route.

The shape data generating unit may synthesize the first three-dimensional shape data in the flight range and the three-dimensional shape data in the loss area to generate fourth three-dimensional shape data in the flight range during the flight.

The three-dimensional shape estimation system may further include the flying object and a communication terminal that communicates with the flying object. The flying object may include a first communication unit, the route generation unit, the imaging unit, the shape data generating unit and the detection unit. The communication terminal may include an operation unit and a second communication unit.

The three-dimensional shape estimation system may further include the flying object and a communication terminal that communicates with the flying object. The flying object may include a first communication unit and the imaging unit. The communication terminal may include an operation unit, a second communication unit, the route generation unit, the shape data generating unit and the detection unit.

A flying object according to one aspect is a flying object for capturing images and estimating a three-dimensional shape, comprising: a shape data generating unit that generates, based on a plurality of first images, first three-dimensional shape data in a flight range; a detection unit that detects, based on the first three-dimensional shape data, a loss area; a route generation unit that generates a first flight route for imaging the loss area; and an imaging unit that images a plurality of imaging ranges which are overlapped partially, in a horizontal direction toward the loss area in the first flight route to acquire a plurality of second images, wherein the shape data generating unit generates, based on the plurality of second images, three-dimensional shape data in the loss area.

The route generation unit may generate a second flight route for imaging by the flying object in the flight range of the flying object. The imaging unit may image a plurality of imaging ranges which are overlapped partially, in the second flight route to acquire the plurality of first images.

The route generation unit may generate the second flight route for imaging by the flying object in the vertical direction in the flight range of the flying object. The imaging unit may image a plurality of imaging ranges which are overlapped partially, in the vertical direction in the second flight route to acquire the plurality of first images.

The route generation unit may generate the first flight route for imaging the loss area at different altitudes. The imaging unit may image a plurality of imaging ranges which are overlapped partially, in the horizontal direction toward the loss area at different altitudes in the first flight route to acquire the plurality of second images.

The route generation unit may generate, based on position information of the loss area, a third flight route by inserting the first flight route into the second flight route. The imaging unit may capture a plurality of images in the vertical direction and the horizontal direction of the loss area in the third flight route to acquire the plurality of first images and the plurality of second images. The shape data generating unit may generate, based on the first images and the second images, second three-dimensional shape data in the flight range.

The flying object may further include a flight control unit. The flight control unit may cause the flying object to fly through the third flight route after flying through the second flight route. The imaging unit may image at a first imaging position interval on the second flight route, and image at a second imaging position interval which is shorter than the first imaging position interval on the third flight route.

The shape data generating unit may synthesize the first three-dimensional shape data in the flight range and the three-dimensional shape data in the loss area to generate third three-dimensional shape data in the flight range.

A flying object according to one aspect is a flying object for capturing images and estimating a three-dimensional shape, comprising: a flight control unit that controls a flight of the flying object; a shape data generating unit that generates, based on a plurality of first images during the flight of the flying object, first three-dimensional shape data in a flight range of the flying object; a detection unit that determines whether there is a loss area based on the first three-dimensional shape data during the flight; a route generation unit that generates a first flight route for imaging the loss area during the flight; and an imaging unit that images a plurality of imaging ranges which are overlapped partially, in a horizontal direction toward the loss area in the first flight route to acquire a plurality of second images, wherein the flight control unit moves the flying object toward the loss area in a case where it is determined that there is a loss area, and the shape data generating unit generates, based on the plurality of second images, three-dimensional shape data in the loss area.

The route generation unit may generate a second flight route for imaging by the flying object in the flight range of the flying object. The imaging unit may image a plurality of imaging ranges which are overlapped partially, in the second flight route to acquire the plurality of first images.

The route generation unit may generate the second flight route for imaging by the flying object in the vertical direction in the flight range of the flying object. The imaging unit may image a plurality of imaging ranges which are overlapped partially, in the vertical direction in the second flight route to acquire the plurality of first images.

The route generation unit may generate the first flight route for imaging the loss area at different altitudes. The imaging unit may image a plurality of imaging ranges which are overlapped partially, in the horizontal direction toward the loss area at different altitudes in the first flight route to acquire the plurality of second images.

The flight control unit may return the flying object to the flight following the second flight route after acquisition of the second images.

The imaging unit may acquire the first images at an imaging position where an image has not been captured in the second flight route.

The shape data generating unit may synthesize the first three-dimensional shape data in the flight range and the three-dimensional shape data in the loss area to generate fourth three-dimensional shape data in the flight range during the flight.

A program according to one aspect is a program for causing a computer that estimates a three-dimensional shape based on images captured by a flying object to execute: a procedure of generating, based on a plurality of first images, first three-dimensional shape data in a flight range of the flying object; a procedure of detecting, based on the first three-dimensional shape data, a loss area; a procedure of generating a first flight route for imaging the loss area; a procedure of imaging a plurality of imaging ranges which are overlapped partially, in a horizontal direction toward the loss area in the first flight route to acquire a plurality of second images; and a procedure of generating, based on the plurality of second images, three-dimensional shape data in the loss area.

A recording medium according to one aspect is a computer-readable recording medium recording a program for causing a computer that estimates a three-dimensional shape based on images captured by a flying object to execute: a procedure of generating, based on a plurality of first images, first three-dimensional shape data in a flight range of the flying object; a procedure of detecting, based on the first three-dimensional shape data, a loss area; a procedure of generating a first flight route for imaging the loss area; a procedure of imaging a plurality of imaging ranges which are overlapped partially, in a horizontal direction toward the loss area in the first flight route to acquire a plurality of second images; and a procedure of generating, based on the plurality of second images, three-dimensional shape data in the loss area.

Incidentally, the above summary of the disclosure does not enumerate all features of the present disclosure. In addition, sub-combinations of groups of features may also be included in the disclosure.

DESCRIPTION OF EMBODIMENTS

Figure 1:
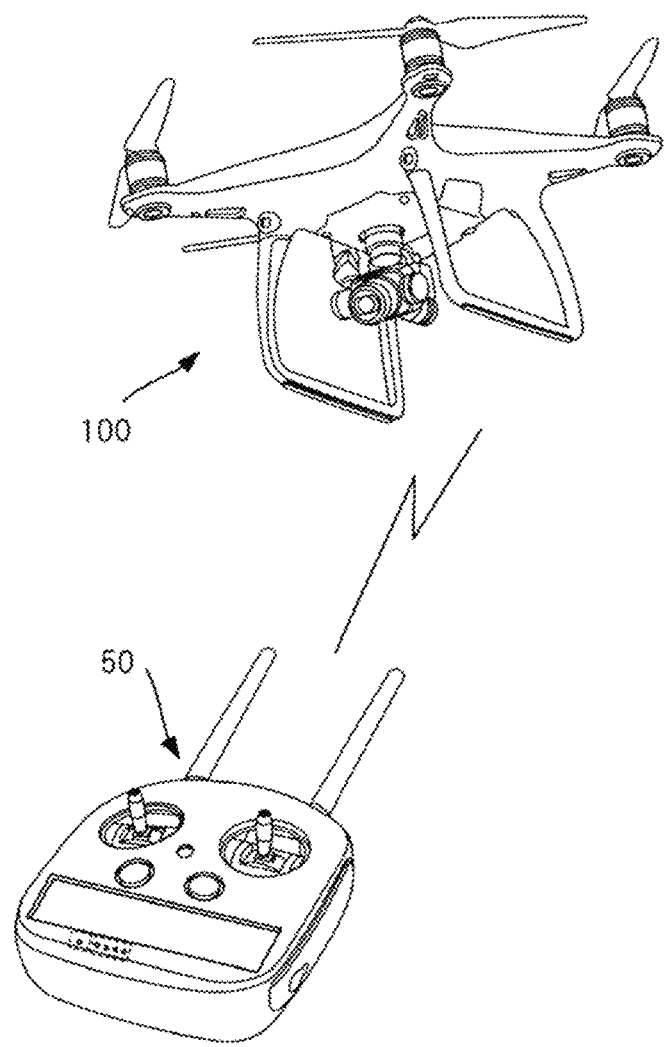
FIG. 1 is a pattern diagram showing a configuration example of a three-dimensional shape estimation system according to one embodiment.

Hereinafter, the present disclosure will be described through embodiments of the disclosure, but the following embodiments are not intended to limit the invention according to the claims. All combinations of features described in the embodiments are not necessarily indispensable for solving means of the disclosure.

In the following embodiments, examples of a flying object may include an unmanned aerial vehicle (UAV). In the drawings of the description, the unmanned aerial vehicle is referred to as "UAV". A three-dimensional shape estimation method defines operations in a three-dimensional shape estimation system. A recording medium records a program (for example, a program for causing at least one of the unmanned aerial vehicle and a transmitter to execute various processes).

FIG. 1 is a pattern diagram showing a configuration example of a three-dimensional shape estimation system 10 according to one embodiment. The three-dimensional shape estimation system 10 includes an unmanned aerial vehicle 100 and a transmitter 50. The unmanned aerial vehicles 100 and the transmitter 50 can communicate with each other by wired communication or wireless communication (for example, a wireless local area network (LAN), Bluetooth®).

Figure 2:
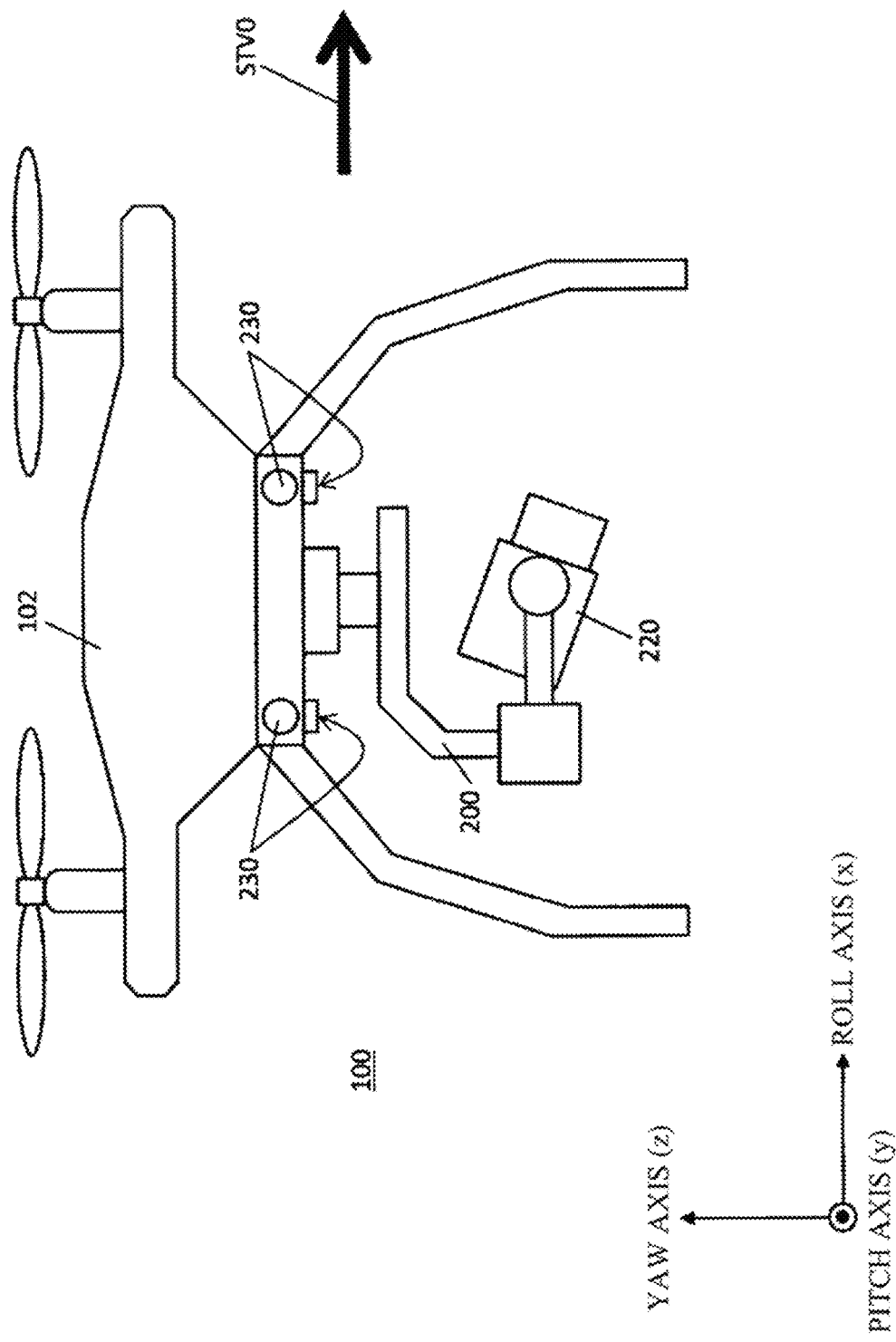
FIG. 2 is a diagram showing an example of an appearance of an unmanned aerial vehicle.
Figure 3:
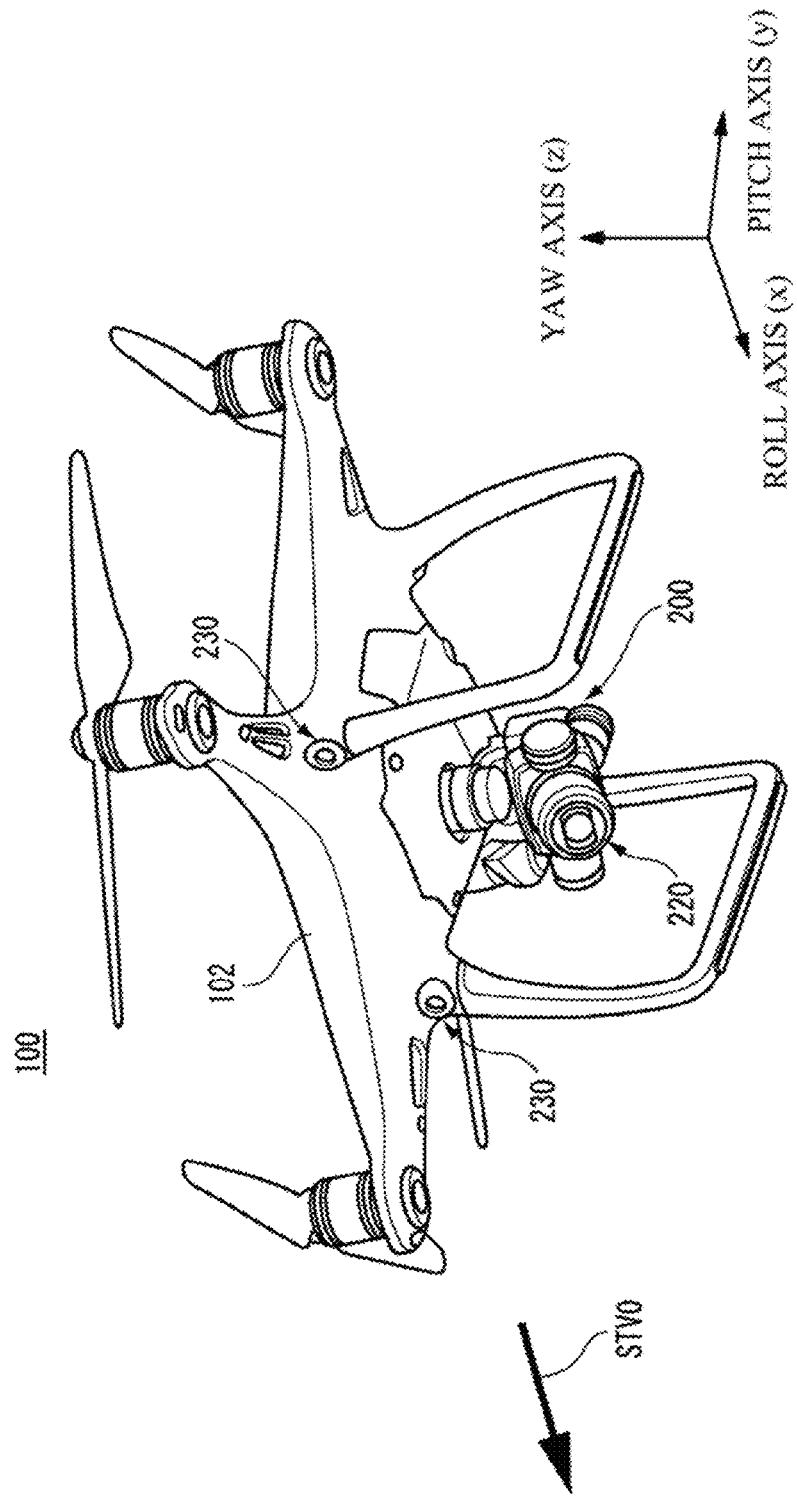
FIG. 3 is a diagram showing an example of a specific appearance of the unmanned aerial vehicle.

FIG. 2 is a diagram showing an example of an appearance of the unmanned aerial vehicle 100. FIG. 3 is a diagram showing an example of a specific appearance of the unmanned aerial vehicle 100. FIG. 2 shows a side view of the unmanned aerial vehicle 100 flying in a moving direction STV0, and FIG. 3 shows a perspective view of the unmanned aerial vehicle 100 flying in the moving direction STV0.

Here, as shown in FIGS. 2 and 3, a roll axis (see the x axis) is defined in a direction parallel to the ground and along the moving direction STV0. In this case, a pitch axis (see the y axis) is defined in a direction parallel to the ground and perpendicular to the roll axis, and a yaw axis (see the z axis) is defined in a direction perpendicular to the ground and perpendicular to the roll axis and the pitch axis.

The unmanned aerial vehicle 100 includes a UAV main body 102, a gimbal 200, an imaging device 220, and a plurality of imaging devices 230. The unmanned aerial vehicle 100 is an example of a flying object. The imaging devices 220 and 230 are examples of an imaging unit.

The UAV main body 102 includes a plurality of rotary wings. The UAV main body 102 controls rotation of the plurality of rotary wings to cause the unmanned aerial vehicle 100 to fly. The UAV main body 102 causes the unmanned aerial vehicle 100 to fly, for example, using four rotary wings. The number of the rotary wings is not limited to four. In addition, the unmanned aerial vehicle 100 may also be a fixed-wing aircraft without rotary wings.

The imaging device 220 is an imaging camera for imaging a subject included in a desired imaging range (for example, the state of the sky as an aerial photographing target, the scenery such as mountains and rivers, and a building on the ground).

The plurality of imaging devices 230 are sensing cameras for imaging surroundings of the unmanned aerial vehicle 100 in order to control the flight of the unmanned aerial vehicle 100. Two imaging devices 230 may be provided on a front surface, for example, a nose, of the unmanned aerial vehicle 100. Further, two other imaging devices 230 may be provided on a bottom surface of the unmanned aerial vehicle 100. The two imaging devices 230 on the front side are paired and may function as a so-called stereo camera. The two imaging devices 230 on the bottom side are also paired and may function as a stereo camera. Three-dimensional spatial data around the unmanned aerial vehicle 100 may be generated based on the image captured by the plurality of imaging device 230. The number of the imaging devices 230 included in the unmanned aerial vehicle 100 is not limited to four. The unmanned aerial vehicle 100 may include at least one imaging device 230. The unmanned aerial vehicle 100 may include at least one imaging device 230 on the nose, a tail, a lateral surface, the bottom surface, and a ceiling surface of the unmanned aerial vehicle 100 separately. An angle of view that can be set by the imaging devices 230 may be larger than an angle of view that can be set by the imaging device 220. The imaging device 230 may include a single focus lens or a fisheye lens.

Figure 4:
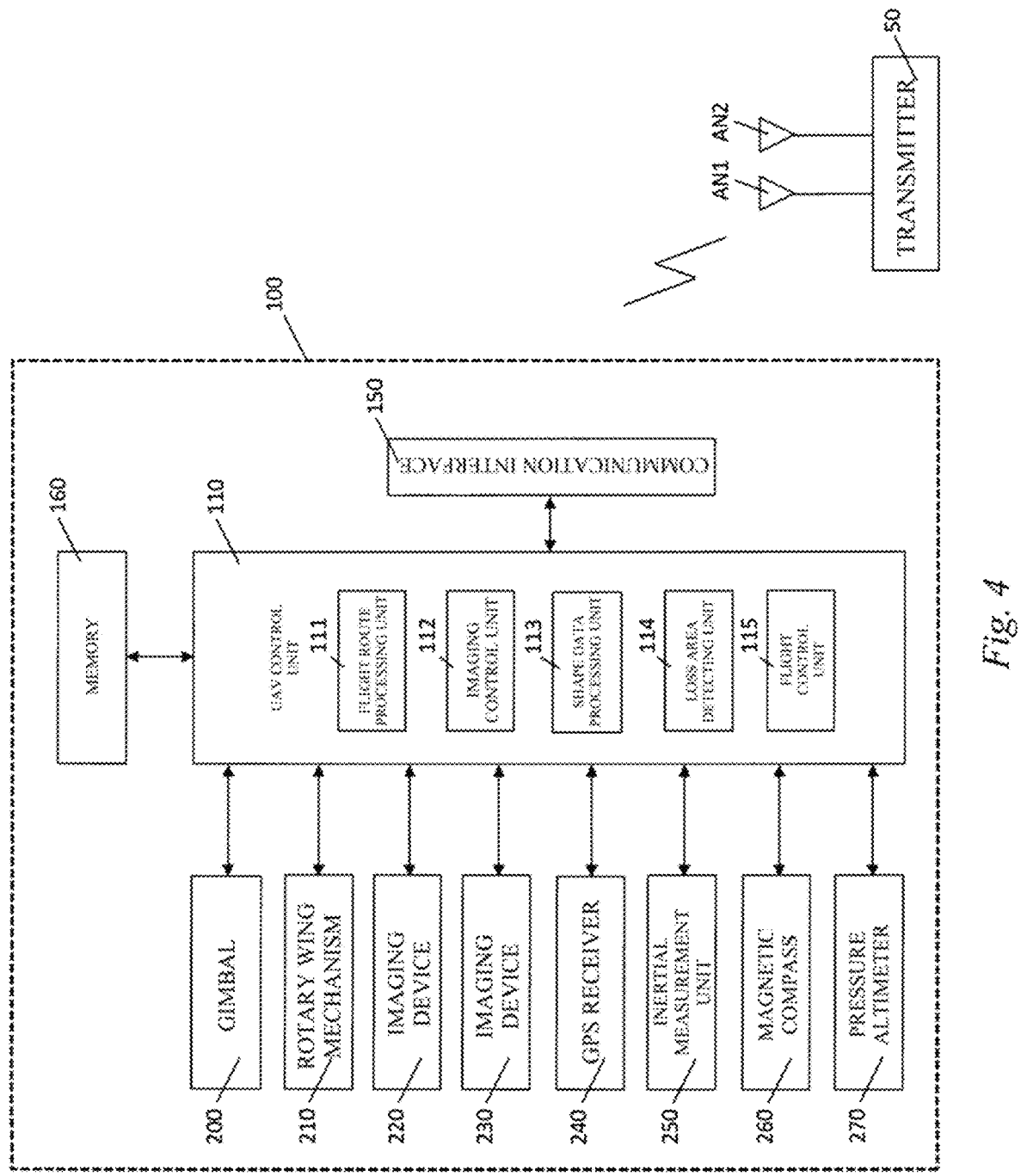
FIG. 4 is a block diagram showing an example of a hardware configuration of the unmanned aerial vehicle.

FIG. 4 is a block diagram showing an example of a hardware configuration of the unmanned aerial vehicle 100. The unmanned aerial vehicle 100 includes a UAV control unit 110, a communication interface 150, a memory 160, the gimbal 200, a rotary wing mechanism 210, the imaging device 220, the imaging devices 230, a GPS receiver 240, an inertial measurement unit (IMU) 250, a magnetic compass 260, and a pressure altimeter 270. The UAV control unit 110 is an example of a processing unit. The communication interface 150 is an example of a communication unit.

The UAV control unit 110 is configured using, for example, a central processing unit (CPU), a micro processing unit (MPU) or a digital signal processor (DSP). The UAV control unit 110 performs signal processing for integrating and controlling operations of each unit of the unmanned aerial vehicle 100, input/output processing of data with other units, data arithmetic processing and data storage processing.

The UAV control unit 110 controls flight of the unmanned aerial vehicle 100 according to a program stored in the memory 160. The UAV control unit 110 controls the flight of the unmanned aerial vehicle 100 according to a command received from the remote transmitter 50 via the communication interface 150. The memory 160 may be removable from the unmanned aerial vehicle 100.

The UAV control unit 110 may specify the surrounding environment of the unmanned aerial vehicle 100 by analyzing a plurality of images captured by the plurality of imaging devices 230. The UAV control unit 110 controls, based on the surrounding environment of the unmanned aerial vehicle 100, the flight to avoid, for example, obstacles.

The UAV control unit 110 acquires date and time information indicating a current date and time. The UAV control unit 110 may acquire date and time information indicating the current date and time from the GPS receiver 240. The UAV control unit 110 may acquire date and time information indicating a current date and time from a timer (not shown) mounted on the unmanned aerial vehicle 100.

The UAV control unit 110 acquires position information indicating a position of the unmanned aerial vehicle 100. The UAV control unit 110 may acquire position information indicating a latitude, a longitude and an altitude where the unmanned aerial vehicle 100 is located from the GPS receiver 240. The UAV control unit 110 may acquire latitude and longitude information indicating a latitude and a longitude where the unmanned aerial vehicle 100 is located from the GPS receiver 240, and may acquire altitude information indicating an altitude where the unmanned aerial vehicle 100 is located from the pressure altimeter 270, as the position information.

The UAV control unit 110 acquires orientation information indicating an orientation of the unmanned aerial vehicle 100 from the magnetic compass 260. An orientation corresponding to an orientation of, for example, a nose of the unmanned aerial vehicle 100 is indicated in the orientation information.

The UAV control unit 110 may acquire position information indicating a position where the unmanned aerial vehicle 100 should be located when the imaging device 220 images an imaging range to be imaged. The UAV control unit 110 may acquire the position information indicating the position where the unmanned aerial vehicle 100 should be located from the memory 160. The UAV control unit 110 may acquire the position information indicating the position where the unmanned aerial vehicle 100 should be located from other devices such as the transmitter 50 via the communication interface 150. The UAV control unit 110 may specify a position where the unmanned aerial vehicle 100 can be located and acquire the position as the position information indicating the position where the unmanned aerial vehicle 100 should be located, so as to image the imaging range to be imaged by referring to a three-dimensional map database.

The UAV control unit 110 acquires imaging information indicating imaging ranges of the imaging device 220 and the imaging devices 230. The UAV control unit 110 acquires angle of view information indicating angles of view of the imaging device 220 and the imaging devices 230 from the imaging device 220 and the imaging devices 230, as parameters for specifying the imaging ranges. The UAV control unit 110 acquires information indicating imaging directions of the imaging device 220 and the imaging devices 230 as parameters for specifying the imaging ranges. The UAV control unit 110 acquires posture information indicating a state of posture of the imaging device 220 from the gimbal 200 as information indicating the imaging direction of the imaging device 220, for example. The UAV control unit 110 acquires information indicating an orientation of the unmanned aerial vehicle 100. The information indicating the state of the posture of the imaging device 220 indicates a rotation angle from a reference rotation angle of a pitch axis and a yaw axis of the gimbal 200. The UAV control unit 110 acquires the position information indicating the position where the unmanned aerial vehicle 100 is located as a parameter for specifying the imaging range. The UAV control unit 110 may acquire imaging information by defining an imaging range indicating a geographical range imaged by the imaging device 220 and by generating, based on the angles of view and the imaging directions of the imaging device 220 and the imaging device 230, imaging information indicating the imaging range, as well as the position where the unmanned aerial vehicle 100 is located.

The UAV control unit 110 may acquire imaging information indicating an imaging range where the imaging device 220 should perform imaging. The UAV control unit 110 may acquire the imaging information indicating the imaging range where the imaging device 220 should perform imaging from the memory 160. The UAV control unit 110 may acquire the imaging information indicating the imaging range where the imaging device 220 should perform imaging from other devices such as the transmitter 50 via the communication interface 150.

The UAV control unit 110 may acquire stereoscopic information (three-dimensional information) indicating a stereoscopic shape (three-dimensional shape) of an object around the unmanned aerial vehicle 100. The object is, for example, a part of a landscape of a building, a road, a car, a tree or the like. The stereoscopic information is, for example, three-dimensional spatial data. The UAV control unit 110 may acquire stereoscopic information by generating stereoscopic information indicating a stereoscopic shape of an object around the unmanned aerial vehicle 100 from each of the images obtained from the plurality of imaging devices 230. The UAV control unit 110 may acquire the stereoscopic information indicating the stereoscopic shape of the object around the unmanned aerial vehicle 100 by referring to a three-dimensional map database stored in the memory 160. The UAV control unit 110 may acquire the stereoscopic information indicating the stereoscopic shape of the object around the unmanned aerial vehicle 100 by referring to a three-dimensional map database managed by a server on the network.

The UAV control unit 110 acquires image data captured by the imaging device 220 and the imaging devices 230.

The UAV control unit 110 controls the gimbal 200, the rotary wing mechanism 210, the imaging device 220 and the imaging devices 230. The UAV control unit 110 controls the imaging range of the imaging device 220 by changing the imaging direction and the angle of view of the imaging device 220. The UAV control unit 110 controls the imaging range of the imaging device 220 supported by the gimbal 200 by controlling a rotation mechanism of the gimbal 200.

In this specification, the imaging range refers to a geographical range captured by the imaging device 220 or the imaging devices 230. The imaging range is defined by the latitude, the longitude, and the altitude. The imaging range may be a range in three-dimensional spatial data defined by the latitude, the longitude, and the altitude. The imaging range is specified based on the angle of view and the imaging direction of the imaging device 220 or the imaging devices 230, and the position where the unmanned aerial vehicle 100 is located. The imaging direction of the imaging device 220 or the imaging devices 230 is defined from the orientation and depression angle of the front where imaging lenses of the imaging device 220 and the imaging devices 230 are provided. The imaging direction of the imaging device 220 is a direction specified based on the orientation of the nose of the unmanned aerial vehicle 100 and the state of posture of the imaging device 220 with respect to the gimbal 200. The imaging directions of the imaging devices 230 are directions specified based on the orientation of the nose of the unmanned aerial vehicle 100 and a position where the imaging device 230 is located.

The UAV control unit 110 controls the flight of the unmanned aerial vehicle 100 by controlling the rotary wing mechanism 210. That is, the UAV control unit 110 controls the position of the unmanned aerial vehicle 100 comprising the latitude, the longitude and the altitude by controlling the rotary wing mechanism 210. The UAV control unit 110 may control the imaging range of the imaging device 220 and the imaging devices 230 by controlling the flight of the unmanned aerial vehicle 100. The UAV control unit 110 may control the angle of view of the imaging device 220 by controlling a zoom lens of the imaging device 220. The UAV control unit 110 may control the angle of view of the imaging device 220 by digital zoom using a digital zoom function of the imaging device 220.

In a case where the imaging device 220 is fixed to the unmanned aerial vehicle 100 and the imaging device 220 cannot be moved, the UAV control unit 110 can cause the imaging device 220 to image a desired imaging range under a desired environment by moving the unmanned aerial vehicle 100 to a specific position at a specific date and time. Alternatively, even in a case where the imaging device 220 does not have the zoom function and cannot change the angle of view of the imaging device 220, the UAV control unit 110 can cause the imaging device 220 to capture a desired imaging range under a desired environment by moving the unmanned aerial vehicle 100 to a specific position at a specific date and time.

The UAV control unit 110 includes a function as a flight route processing unit 111 that performs processing related to generation of a flight route. The UAV control unit 110 includes a function as an imaging control unit 112 that performs processing related to imaging control. The UAV control unit 110 includes a function as a shape data processing unit 113 that performs processing related to generation of three-dimensional shape data. The UAV control unit 110 includes a function as a loss area detecting unit 114 that performs processing related to detection of a loss area. The UAV control unit 110 includes a function as a flight control unit 115 that performs processing related to flight control of the unmanned aerial vehicle 100. The flight route processing unit 111 is an example of a route generation unit. The shape data processing unit 113 is an example of a shape data generating unit. The loss area detecting unit 114 is an example of a detection unit.

In addition, the flight route processing unit 111 may acquire input parameters input by the transmitter 50 via the communication interface 150. The input parameters may be stored in the memory 160. The input parameters may include information on a flight range, information on a center position (for example, latitude and longitude) of a flight range, information on a radius of a flight range, information on a flight altitude, information on an imaging distance and information on an imaging position interval. A flight route for the unmanned aerial vehicle 100 to fly is formed within the flight range. The imaging position interval is an interval (distance) between two adjacent imaging positions among a plurality of imaging positions (waypoint) disposed on the flight route.

The flight route processing unit 111 may calculate, based on the input parameters received from the transmitter 50 the flight range. The flight route processing unit 111 may calculate, based on the center position of the flight range and the radius of the flight range, the flight range by approximating the flight range to a circular shape. The input parameters may include information on a length of one side on periphery of the flight range. The flight route processing unit 111 may calculate the flight range by approximating the flight range to a polygonal shape having the length of one side on the periphery of the flight range. The flight route processing unit 111 may acquire the flight route by receiving information of the flight range generated by the transmitter 50 via the communication interface 150 from the transmitter 50 without calculating the flight range.

The flight route processing unit 111 generates a flight route FP within the flight range. The flight route FP may be a flight route FPA which moves linearly at one same altitude and through which a two-dimensional (horizontal direction) flight range is scanned in order. That is, the flight route FPA may be a flight route FPA which moves linearly in a first direction at one same altitude, shifts slightly in a second direction perpendicular to the first direction, and moves linearly in the first direction again. The flight route FPA is an example of a second flight route.

The flight route FP may include a flight route FPB which moves through different altitudes. The flight route FPB may be a flight route in which the unmanned aerial vehicle 100 starts rising or descending from an initial position with an initial longitude, an initial latitude and an initial altitude; ends by rising or descending at a position with an end altitude; and then descends or rises again toward the initial altitude. The flight route FPB is an example of a first flight route.

The flight route FP may be a flight route FPC comprising both flight route FPA and flight route FPB. The flight route FPC is an example of a third flight route.

The flight route processing unit 111 may dispose an imaging position (Waypoint) where an image is to be captured by the imaging device 220 or 230 on the flight route FP. The intervals of the imaging positions (imaging position interval) may be disposed at equal intervals, for example. The imaging positions are disposed such that imaging ranges related to images at each two adjacent imaging positions are partially overlapped. Therefore, three-dimensional restoration can be performed using a plurality of images. Since the imaging device 220 or 230 has a predetermined angle of view, a part of both imaging ranges are overlapped by shortening the imaging position interval.

The flight route processing unit 111 may acquire information on the imaging position interval included in the input parameters. The flight route processing unit 111 may also calculate and acquire the imaging position interval. For example, the flight route processing unit 111 may calculate the imaging position interval based on the altitude (imaging altitude) at which the imaging position is disposed and resolution of the imaging device 220 or 230. An overlapping rate of the imaging ranges becomes larger as the imaging altitude becomes higher or the imaging distance becomes longer, so that the imaging position interval can be lengthened (sparsely). The overlapping rate of the imaging ranges becomes smaller as the imaging altitude becomes lower or the imaging distance becomes shorter, so that the imaging position interval can be shortened (densely). The flight route processing unit 111 may further calculate the imaging position interval based on the angle of view of the imaging device 220 or 230. The flight route processing unit 111 may calculate the imaging position interval by other known methods.

The imaging positions are disposed at the same altitude on the flight route FPA. That is, the imaging positions are disposed in the horizontal direction. The imaging control unit 112 causes the imaging device 220 or 230 to image in the vertical direction at each imaging position on the flight route FPA. The imaging positions are disposed at different altitudes on the flight route FPB. That is, the imaging positions are disposed in the horizontal direction. The imaging control unit 112 causes the imaging device 220 or 230 to image in the horizontal direction at each imaging position on the flight route FPB. Incidentally, on the flight route FPB, a plurality of imaging positions may be provided at the same altitude. On the flight route FPC, there is a section in which the imaging positions are disposed at the same altitude and a section in which the imaging positions are disposed at different altitudes. The imaging control unit 112 causes the imaging device 220 or 230 to image in the vertical direction or the horizontal direction at each imaging position on the flight route FPC. An image captured on the flight route FPA is an example of a first image. An image captured on the flight route FPB is an example of a second image.

The flight control unit 115 controls flight of the unmanned aerial vehicle 100 according to a generated flight route FP. The unmanned aerial vehicle 100 may fly through the flight route FPA under the control of the flight control unit 115. The unmanned aerial vehicle 100 may fly through the flight route FPB under the control of the flight control unit 115. The unmanned aerial vehicle 100 may fly through the flight route FPA and the flight route FPB at different times under the control of the flight control unit 115. That is, the unmanned aerial vehicle 100 may return once after the flight of the flight route FPA is completed and start the flight route FPB. The unmanned aerial vehicle 100 may continuously fly through the flight route FPA and the flight route FPB, that is, the flight route FPC, under the control of the flight control unit 115.

The imaging control unit 112 causes the imaging device 220 or imaging device 230 to image in the vertical direction or the horizontal direction at each imaging position on the flight route. Images captured by the imaging device 220 or the imaging device 230 may be stored in the memory 160. The UAV control unit 110 may refer to the memory 160 as appropriate (for example, when generating the three-dimensional shape data).

The shape data processing unit 113 may generate stereoscopic information (three-dimensional information) indicating a stereoscopic shape (three-dimensional shape) of an object (subject) from a plurality of images captured at different imaging positions by any one of the imaging devices 220 and 230. A known method may be used as a method for generating a three-dimensional shape based on a plurality of images. Examples of the known method include Multi View Stereo (MVS), patch-based MVS (PMVS), and Structure from Motion (SfM). MVS and MPVS may be used to improve the restoration result of a three-dimensional shape by SfM.

The plurality of images used for generating the three-dimensional shape include two images whose imaging ranges are partially overlapped with each other. The images used for generating the three-dimensional shape may be a still image. The higher a ratio of overlapping (that is, the overlapping rate of imaging ranges) is, the large the number of images used for generating the three-dimensional shape is when the three-dimensional shape is generated in the same range. Therefore, the shape data processing unit 113 can improve the restoration accuracy of the three-dimensional shape. In contrast, the lower the overlapping rate of imaging ranges is, the smaller the number of images used for generating the three-dimensional shape is when the three-dimensional shape is generated in the same range. Therefore, the shape data processing unit 113 can reduce the time for generating the three-dimensional shape.

The loss area detecting unit 114 detects whether there is a loss area in the generation result of the three-dimensional shape data. The loss area is an area in the three-dimensional space where point group data configuring the generated three-dimensional shape data is lower than a predetermined number. The loss area may also be an area where point group data configuring the generated three-dimensional shape data is lower than a predetermined ratio. The loss area occurs in a case where the images used for generating the three-dimensional shape data is insufficient. For example, when the imaging device 220 or 230 performs imaging from above, there is one part of the object which becomes the shadow of another part of the object and is not able to be captured. In this case, information on pixel values as data (an example of the point group data) for each position (latitude, longitude, altitude) in the three-dimensional space within the imaging range is insufficient. When there is a position whose information on pixel values is insufficient in the three-dimensional space, the restoration accuracy of the three-dimensional shape data in a peripheral area around this position is reduced. The peripheral area is the loss area.

The imaging control unit 112 controls the imaging device 220 or 230 to image in the horizontal direction of the loss area at each imaging position on the flight route FPB or each imaging position in sections of the flight route FPC which are corresponding to the flight route FPB. Therefore, the point group data which is insufficient in the loss area is supplemented, and shape data processing unit 113 can improve the restoration accuracy of the three-dimensional shape data.

The communication interface 150 communicates with the transmitter 50 (see FIG. 4). The communication interface 150 receives various instructions and information from the transmitter 50 on the UAV control unit 110.

The memory 160 stores programs or the like necessary for the UAV control unit 110 to control the gimbal 200, the rotary wing mechanism 210, the imaging device 220, the imaging devices 230, the GPS receiver 240, the inertial measurement unit 250, the magnetic compass 260, and the pressure altimeter 270. Further, the memory 160 stores programs necessary for execution of the UAV control unit 110, for example, the flight route processing unit 111, imaging control unit 112, shape data processing unit 113, loss area detecting unit 114 and flight control unit 115. The memory 160 may be a computer-readable recording medium, and may include at least one of a flash memory such as an static random access memory (SRAM), a dynamic random access memory (DRAM), an erasable programmable read only memory (EPROM), an electrically erasable programmable read-only memory (EEPROM), and a USB memory. The memory 160 may be provided in the UAV main body 102. The memory 160 may be provided to be detachable from the UAV main body 102.

The gimbal 200 supports the imaging device 220 rotatably around at least one axis. The gimbal 200 may rotatably support the imaging device 220 around the yaw axis, the pitch axis, and the roll axis. The gimbal 200 causes the imaging device 220 to rotate around at least one of the yaw axis, the pitch axis and the roll axis, and thereby the imaging direction of the imaging device 220 may be changed.

The rotary wing mechanism 210 includes a plurality of rotary wings and a plurality of drive motors for rotating the plurality of rotary wings.

The imaging device 220 captures an image of a subject in a desired imaging range and generates data of the image. The image data obtained by the imaging of the imaging device 220 is stored in a memory of the imaging device 220 or the memory 160.

The imaging device 230 images the surroundings of the unmanned aerial vehicle 100 and generates data of the image. The image data of the imaging device 230 is stored in the memory 160.

The GPS receiver 240 receives a plurality of signals indicating time points when a plurality of navigation satellites (for example, GPS satellites) send the signals, and indicating positions (coordinates) of the GPS satellites. The GPS receiver 240 calculates, based on the plurality of received signals, the position (for example, the position of the unmanned aerial vehicle 100) of the GPS receiver 240. The GPS receiver 240 outputs the position information of the unmanned aerial vehicle 100 to the UAV control unit 110. The calculation of the position information of the GPS receiver 240 may be performed by the UAV control unit 110 instead of the GPS receiver 240. In this case, the UAV control unit 110 is input with the time points and the positions of the GPS satellites included in the plurality of signals received by the GPS receiver 240.

The inertial measurement unit 250 detects a posture of the unmanned aerial vehicle 100 and outputs the detection result to the UAV control unit 110. The inertial measurement unit IMU 250 detects accelerations in three axial directions, which are front-rear, left-right, and up-down directions, of the unmanned aerial vehicle 100, and angular velocities in three axial directions, which are the pitch axis, the roll axis, and the yaw axis, as the posture of the unmanned aerial vehicle 100.

The magnetic compass 260 detects the orientation of the nose of the unmanned aerial vehicle 100, and outputs the detection result to the UAV control unit 110.

The pressure altimeter 270 detects a flight altitude of the unmanned aerial vehicle 100 and outputs the detection result to the UAV control unit 110.

Figure 5:
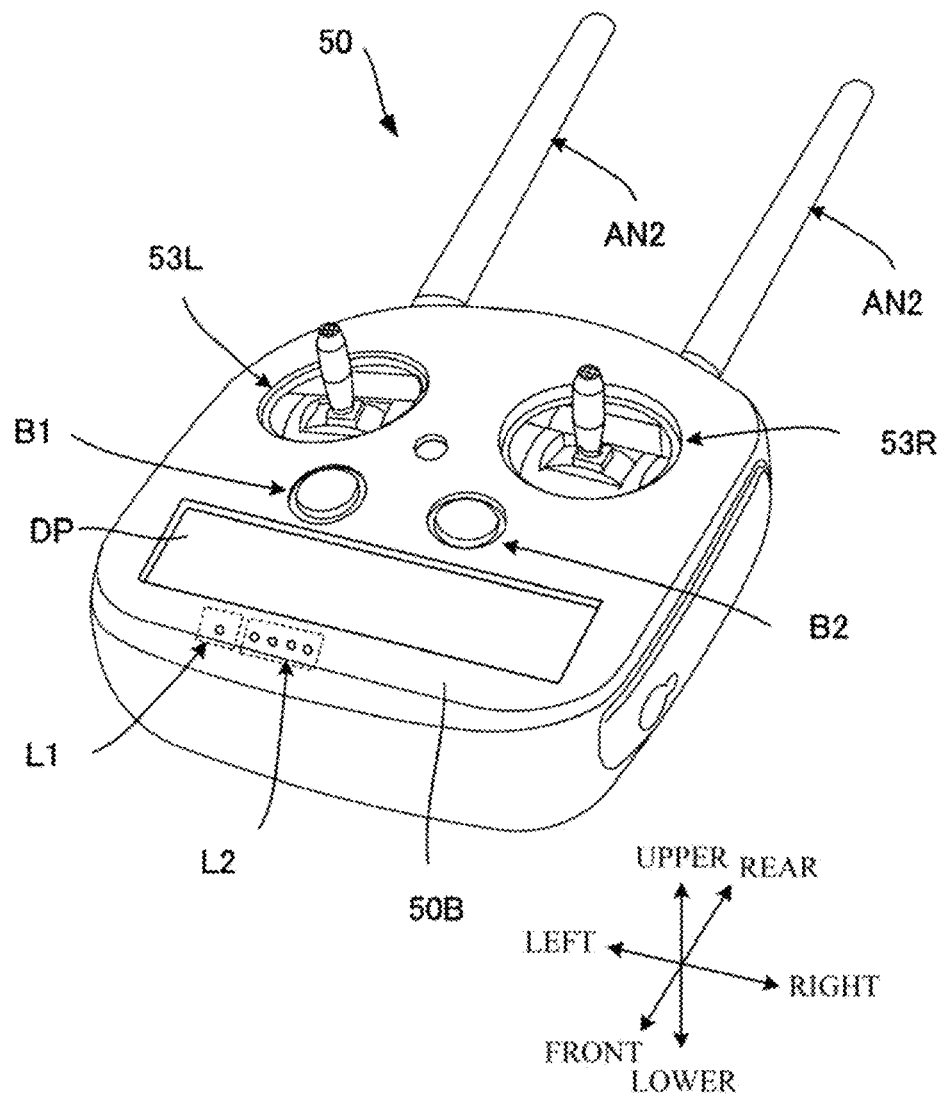
FIG. 5 is a perspective view showing an example of an appearance of a transmitter.

Next, a configuration example of the transmitter 50 will be described. FIG. 5 is a perspective view showing an example of an appearance of the transmitter 50. Directions of upper and lower, front and rear, left and right with respect to the transmitter 50 follow the directions of arrows shown in FIG. 5.

The transmitter 50 is used in a state of being grasped with both hands of, for example, a person (hereinafter referred to as "operator") using the transmitter 50. The transmitter 50 includes, for example, a resin-made casing 50B having a substantially rectangular parallelepiped shape (in other words, substantially box shape) having a substantially square bottom surface and a height shorter than one side of the bottom surface. A specific configuration of the transmitter 50 will be described later by referring to FIG. 4. A left control rod 53L and a right control rod 53R are disposed so as to protrude from substantially the center of a casing surface of the transmitter 50.

The left control rod 53L and the right control rod 53R are used in operations for remotely controlling the movement of the unmanned aerial vehicle 100 by the operator, respectively (for example, back and forth movement, left and right movement, up and down movement, direction change of the unmanned aerial vehicle 100). In FIG. 5, the left control rod 53L and the right control rod 53R are shown to be at an initial state where no external force is applied from both hands of the operator. The left control rod 53L and the right control rod 53R automatically return to a predetermined position (for example, the initial position shown in FIG. 5) after the external force applied by the operator is released.

A power button B1 of the transmitter 50 is disposed on a front side of the left control rod 53L (in other words, an operator side). When the operator presses the power button B1 once, for example, the remaining capacity of a battery (not shown) built in the transmitter 50 is displayed on a battery remaining amount display unit L2. When the operator presses the power button B1 again, for example, a power supply of the transmitter 50 is turned on, and the power is supplied to each unit (see FIG. 6) of the transmitter 50 to be usable.

An RTH (Return To Home) button B2 is disposed on the front side of the right control rod 53R (in other words, the operator side). When the operator presses the RTH button B2, the transmitter 50 transmits a signal, for automatically returning to a predetermined position, to the unmanned aerial vehicle 100. Accordingly, the transmitter 50 can automatically return the unmanned aerial vehicle 100 to a predetermined position (for example, a takeoff position stored by the unmanned aerial vehicle 100). For example, when the operator loses sight of the body of the unmanned aerial vehicle 100 during aerial photography performed by the unmanned aerial vehicle 100 outdoors, or when the unmanned aerial vehicle 100 encounters radio interference or unexpected trouble and becomes inoperable, the RTH button B2 can be used.

A remote status display unit L1 and the battery remaining amount display unit L2 are disposed on the front side of the power button B1 and the RTH button B2 (in other words, the operator side). The remote status display unit L1 is configured using, for example, an LED (Light Emission Diode), and displays a wireless connection state between the transmitter 50 and the unmanned aerial vehicle 100. The battery remaining amount display unit L2 is configured using, for example, an LED, and displays the remaining capacity of the battery (not shown) built in the transmitter 50.

Two antennas AN1 and AN2 are disposed behind the left control rod 53L and the right control rod 53R and protrude from a rear side surface of the casing 50B of the transmitter 50. The antennas AN1 and AN2 transmit, based on the operation of the left control rod 53L and the right control rod 53R of the operator, a signal (that is, a signal for controlling movement of the unmanned aerial vehicle 100) generated by a transmitter control unit 61 to the unmanned aerial vehicle 100. The antennas AN1 and AN2 can cover a transmission and reception range of 2 km, for example. In addition, when images captured by imaging devices 220 and 230 included in the unmanned aerial vehicle 100 which is wirelessly connected to the transmitter 50 or various data acquired by the unmanned aerial vehicle 100 are transmitted from the unmanned aerial vehicle 100, the antennas AN1 and AN2 can receive these images or various data.

The display unit DP is configured to include, for example, an crystal liquid display (LCD). The display unit DP displays various data. The shape, size, and dispose position of the display unit DP are not limited to the example of FIG. 5, and may be in any manner.

Figure 6:
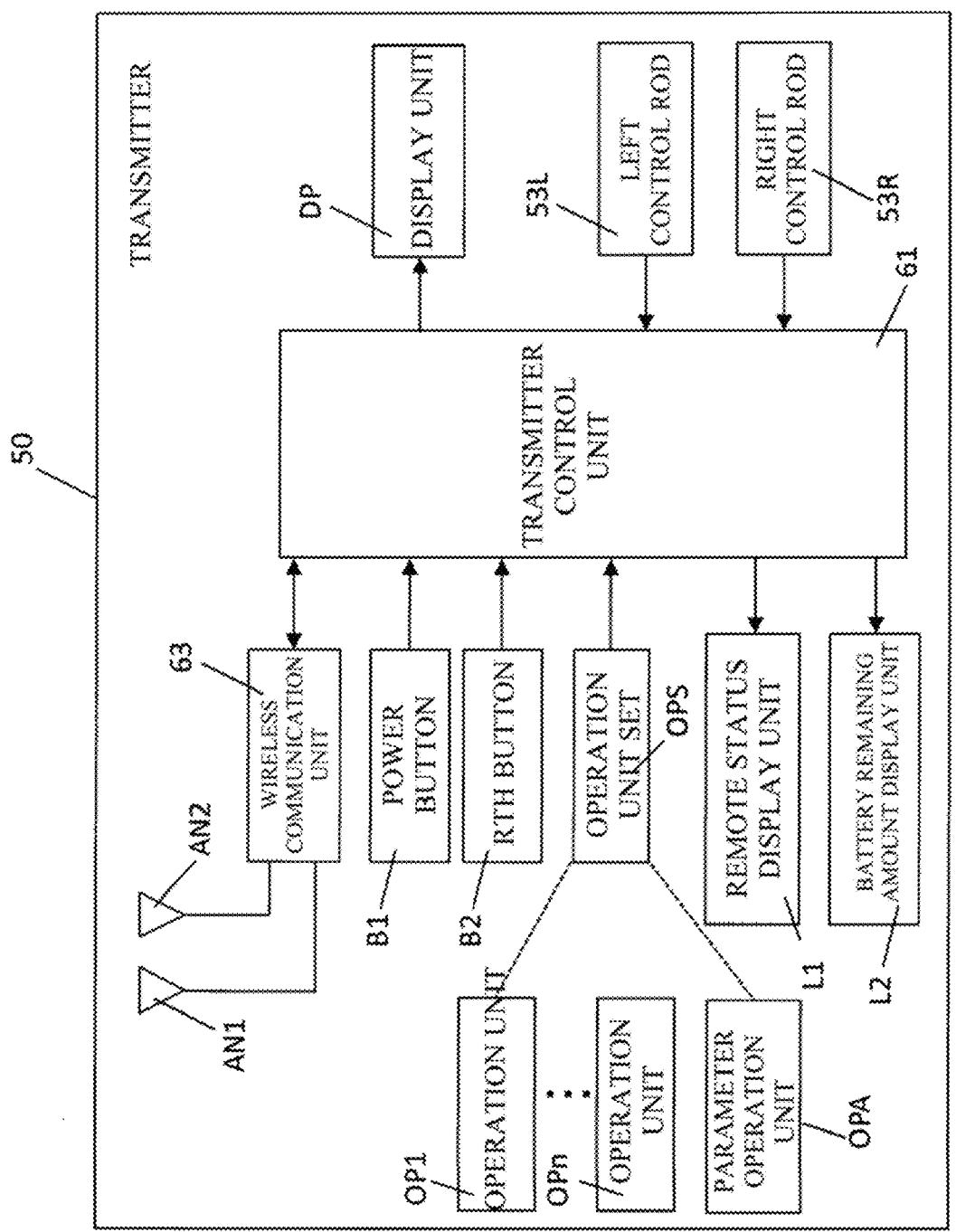
FIG. 6 is a block diagram showing an example of a hardware configuration of the transmitter.

FIG. 6 is a block diagram showing an example of a hardware configuration of the transmitter 50. The transmitter 50 includes the left control rod 53L, the right control rod 53R, the transmitter control unit 61, a wireless communication unit 63, the power button B1, the RTH button B2, an operation unit set OPS, the remote status display unit L1, the battery remaining amount display unit L2, and the display unit DP. The transmitter 50 is an example of the communication terminal. The wireless communication unit 63 is an example of the communication unit.

The left control rod 53L is used for an operation of remotely controlling the movement of the unmanned aerial vehicle 100, for example, by the left hand of the operator. The right control rod 53R is used for an operation of remotely controlling the movement of the unmanned aerial vehicle 100, for example, by the right hand of the operator. The movement of the unmanned aerial vehicle 100 includes any one of, for example, a movement in a forward direction, a movement in a backward direction, a movement in a left direction, a movement in a right direction, a movement in an upward direction, a movement in a downward direction, a movement of turning the unmanned aerial vehicle 100 leftward, a movement of turning the unmanned aerial vehicle 100 rightward, or a combination thereof, which is the same below.

When the power button B1 is pressed once, a signal indicating that the power button B1 has been pressed once is input to the transmitter control unit 61. According to this signal, the transmitter control unit 61 displays the remaining capacity of the battery (not shown) built in the transmitter 50 on the battery remaining amount display unit L2. Accordingly, the operator can easily confirm the remaining capacity of the battery built in the transmitter 50. In addition, when the power button B1 is pressed again, a signal indicating that the power button B1 has been pressed again is sent to the transmitter control unit 61. According to this signal, the transmitter control unit 61 instructs the battery (not shown) built in the transmitter 50 to supply power to each unit in the transmitter 50. Accordingly, the operator turns on the power supply of the transmitter 50 and can easily start using the transmitter 50.

When the RTH bottom B2 is pressed, a signal indicating that the bottom has been pressed is input to the transmitter control unit 61. According to this signal, the transmitter control unit 61 generates a signal for automatically returning the unmanned aerial vehicle 100 to a predetermined position (e.g., the takeoff position of the unmanned aerial vehicle 100) and transmits the signal to the unmanned aerial vehicle 100 via the wireless communication unit 63 and the antennas AN1 and AN2. Accordingly, the operator can automatically return the unmanned aerial vehicle 100 to the predetermined position by a simple operation on the transmitter 50.

The operation unit set OPS is configured by using a plurality of operation units (e.g., operation unit OP1, . . . , operation unit OPn) (n: an integer of 2 or more). The operation unit set OPS includes other operation units (e.g., various operation units for supporting the remote control of the unmanned aerial vehicle 100 by the transmitter 50) except for the left control rod 53L, the right control rod 53R, the power button B1 and the RTH button B2 shown in FIG. 4. The various operation units mentioned here correspond to, for example, a button for instructing the imaging of a still image using the imaging device 220 of the unmanned aerial vehicle 100, a button for instructing start and end of video recording using the imaging device 220 of the unmanned aerial vehicle 100, a dial for adjusting the inclination of a gimbal 200 (see FIG. 4) of the unmanned aerial vehicle 100 in an inclination direction, a button for switching the flight mode of the unmanned aerial vehicle 100, and a dial for setting the imaging device 220 of the unmanned aerial vehicle 100.

The operation unit set OPS includes a parameter operation unit OPA that inputs information on the input parameters for generating an imaging interval position, an imaging position, or a flight route of the unmanned aerial vehicle 100. The parameter operation unit OPA may be formed by a stick, various buttons, various keys, a touch panel, or the like. The parameter operation unit OPA may also be the right control rod 53L, and the right control rod 53R. The timing of inputting each parameter included in the input parameters by the parameter operation unit OPA may be the same or different.

The input parameters may include information on a flight range, information on a center position (for example, latitude and longitude) of a flight range, information on a radius of a flight range, information on a flight altitude, information on an imaging distance and information on an imaging position interval.

By inputting specific values or ranges of latitude and longitude, the parameter operation unit OPA may input at least one of information on a flight range, information on a radius of a flight range (a radius of a flight route), information on a center position (for example, latitude and longitude) of a flight range, information on a flight altitude, information on an imaging distance and information on an imaging position interval.

Since the remote status display unit L1 and the battery remaining amount display unit L2 have been described with reference to FIG. 5, the description thereof is omitted here.

The transmitter control unit 61 is configured by using a processor (for example, a CPU, an MPU or a DSP). The transmitter control unit 61 performs signal processing for integrating and controlling operations of each unit of the transmitter 50, input/output processing of data with other units, data arithmetic processing and data storage processing.

For example, the transmitter control unit 61 generates a signal for controlling the movement of the unmanned aerial vehicle 100 specified by the operation of the left control rod 53L and the right control rod 53R of the operator. The transmitter control unit 61 transmits the generated signal to the unmanned aerial vehicle 100 via the wireless communication unit 63 and the antennas AN1 and AN2 to remotely control the unmanned aerial vehicle 100. Accordingly, the transmitter 50 can remotely control the movement of the unmanned aerial vehicle 100.

For example, the transmitter control unit 61 acquires map information of map database stored in an external server or the like via the wireless communication unit 63. The transmitter control unit 61 displays the map information via the display unit DP, selects a flight range by a touch operation or the like on the map information via the parameter operation unit OPA, and may acquire at least one of information on a flight range, information on a radius of a flight range (a radius of a flight route), information on a center position (for example, latitude and longitude) of a flight range, and information on the length of one side of on periphery of a flight range.

For example, the transmitter control unit 61 transmits the input parameters which are input by the parameter operation unit OPA to the unmanned aerial vehicle 100 via the wireless communication unit 63. The timing of transmitting each parameter included in the input parameters may be the same or different.

For example, the transmitter control unit 61 acquires the information on input parameters which are input by the parameter operation unit OPA and transmits to the display unit DP and the wireless communication unit 63.

The wireless communication unit 63 is connected to the two antennas AN1 and AN2. The wireless communication unit 63 transmits and receives information and data using a predetermined wireless communication method (for example, Wifi®) with the unmanned aerial vehicle 100 via the two antennas AN1 and AN2. The wireless communication unit 63 transmits the information on the input parameters from the transmitter control unit 61 to the unmanned aerial vehicle 100.

The display unit DP displays various data processed by the transmitter control unit 61. The display unit DP displays information on the input parameters which are input. Therefore, the operator of the transmitter 50 can confirm the content of the input parameters by referring to the display unit DP.

The transmitter 50 may be connected to a display terminal (not shown) by wired or wireless connection instead of comprising the display unit DP. The display terminal may display information on the input parameters as the display unit DP. The display terminal may be a smart phone, a tablet terminal, a personal computer (PC) or the like. Further, the display terminal may input at least one of the input parameters and transmit the input parameters to the transmitter 50 by wired communication or wireless communication, and the wireless communication unit 63 of the transmitter 50 may transmit the input parameters to the unmanned aerial vehicle 100.

Next, an operation example of the three-dimensional shape estimation system 10 will be described.

Figure 7:
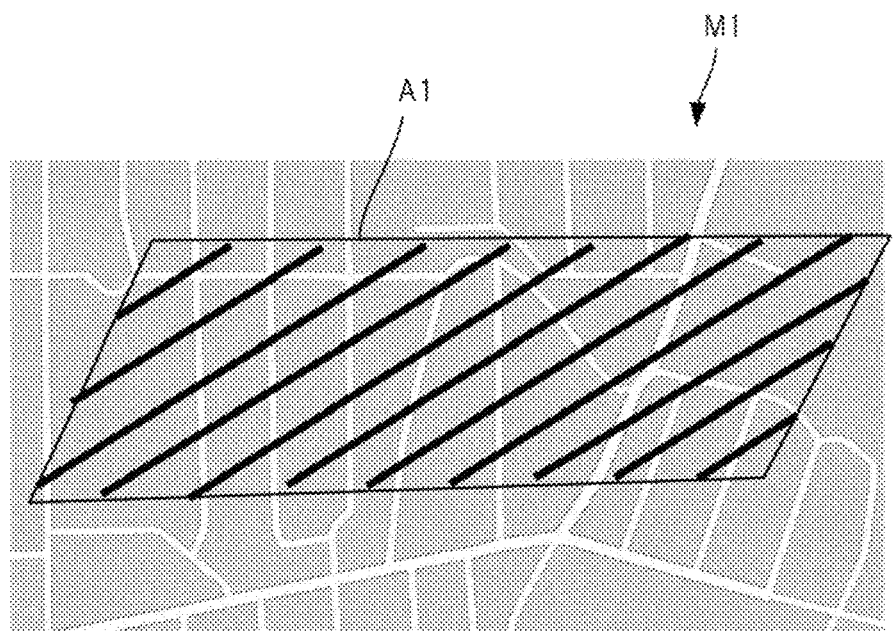
FIG. 7 is a diagram for explaining an input example of a flight range.

FIG. 7 is a diagram for explaining an input example of a flight range.

In the transmitter 50, the parameter operation unit OPA inputs information on a flight range A1. The parameter operation unit OPA may accept a user input in a desired range where the three-dimensional shape data is desired to generate and which is indicated in map information M1, as the flight range A1. The information on the flight range A1 is not limited to a desired range and may also be a predetermined flight range. The predetermined flight range may be one of ranges for periodically generating three-dimensional shape data to measure a three-dimensional shape, for example.

Figure 8:
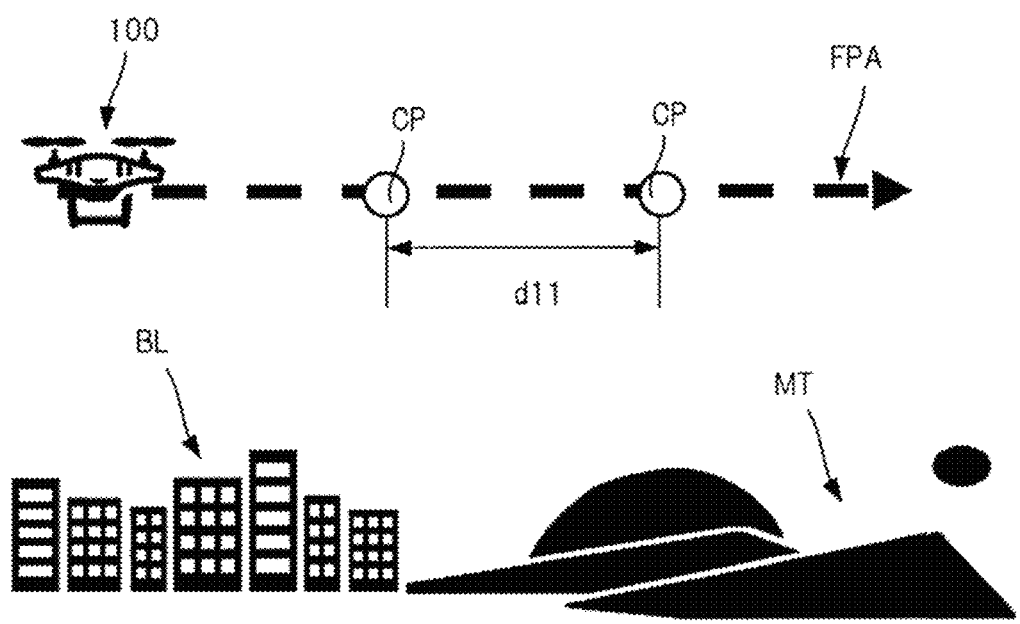
FIG. 8 is a diagram for explaining schematic imaging on a flight route FPA.

FIG. 8 is a diagram for explaining schematic imaging on the flight route FPA.

The flight route processing unit 111 may set intervals between the respective imaging positions CP (imaging position interval) to interval d11 in the flight route FPA. The interval d11 is a sparse interval (for example, an interval of several tens of meters) to an extent that the size of an object (for example, a building) can be estimated. The interval d11 is set to an interval at which at least imaging ranges at adjacent imaging positions CP are partially overlapped. The imaging at each imaging position CP at the interval d11 of the flight route FPA may be referred to as schematic imaging. The unmanned aerial vehicle 100 can image at sparse intervals, so that an imaging time can be shortened compared to imaging at dense intervals. In the vertical direction (the direction toward the ground) of the flight route on which the unmanned aerial vehicle 100 flies, scenery comprising a building BL and a mountain MT may spread. Therefore, the building BL and the mountain MT are in the imaging range and become imaging targets.

Figure 9:
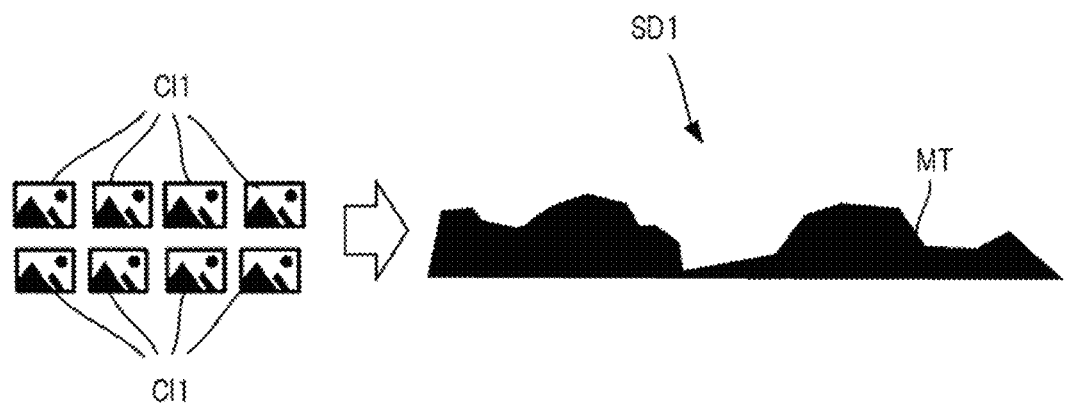
FIG. 9 is a diagram for explaining generation of three-dimensional shape data based on the schematic imaging obtained by the flight route FPA.

FIG. 9 is a diagram for explaining generation of three-dimensional shape data based on the schematic imaging obtained by the flight route FPA.

The shape data processing unit 113 generates, based on a plurality of images CI1 obtained at each imaging position CP by schematic imaging of the flight route FPA, three-dimensional shape data SD1. A user of the three-dimensional shape estimation system 10 can grasp an approximate shape of the ground in the vertical direction of the flight route FPA by confirming the three-dimensional shape data SD1 by displaying or the like. The user of the three-dimensional shape estimation system 10 can confirm that the mountain MT exists by confirming the shape (approximate shape) obtained by the three-dimensional shape data SD1 based on the schematic imaging, but can not confirm the existence of the building BL. This is because the mountain MT has a gentle contour and images taken from the sky along the flight route FPA are already sufficient for the generation of the three-dimensional shape data SD1 in the images CI1. In addition, this is because a contour of the building BL is substantially parallel to the vertical direction, and it is difficult to sufficiently image the lateral surface of the building BL at the imaging positions CP of the flight route FPA where the unmanned aerial vehicle 100 travels in the horizontal direction above the building BL. That is, the periphery of the building BL is a loss area. Therefore, the shape data processing unit 113 can present the loss area by generating the three-dimensional shape data SD1 based on the images related to the schematic imaging. The three-dimensional shape data SD1 is an example of a first three-dimensional shape in the flight range.

Figure 10:
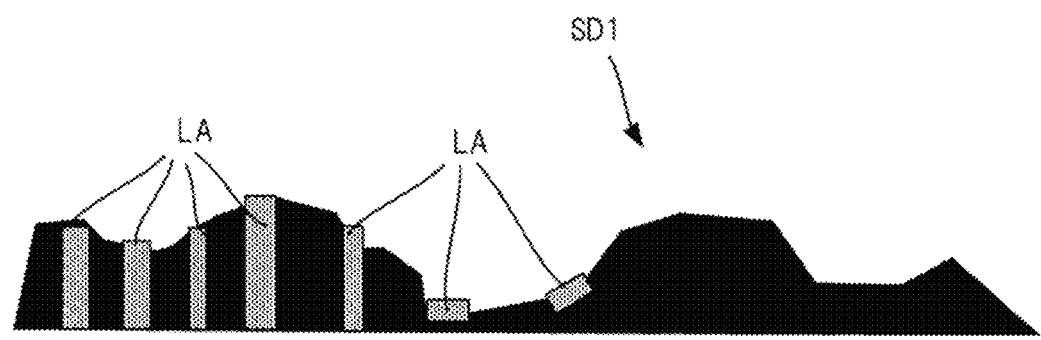
FIG. 10 is a diagram for explaining detection of a loss area.

FIG. 10 is a diagram for explaining detection of a loss area.

The loss area detecting unit 114 detects a loss area LA in the generated three-dimensional shape data SD (SD1). One loss area LA may be detected or a plurality of loss areas LA may be detected. The loss area LA may occur because image information for generating the three-dimensional shape data SD1, that is, information on pixel values at positions in the three-dimensional space is insufficient on the lateral surface of the building BL. Further, when the imaging device 220 or 230 is taken as the viewpoint, the loss area LA may occur because the image information for generating the three-dimensional shape data SD1 is insufficient in one portion (for example, a base of a parabolic antenna) of the building BL (for example, the parabolic antenna) covered by the other portion (for example, a reflector of the parabolic antenna) of the building BL.

Figure 11:
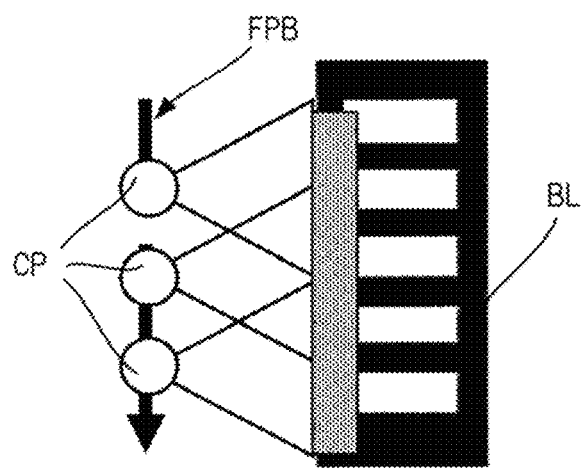
FIG. 11 is a diagram for explaining a generation example of a flight route FPB.

FIG. 11 is a diagram for explaining a generation example of the flight route FPB.

The flight route processing unit 111 may acquire an imaging distance and an imaging position interval related to the flight route FPB. The imaging distance related to the flight route FPB is a distance between the unmanned aerial vehicle 100 and the loss area LA. In FIG. 11, the area of the building BL is shown as the loss area LA. The flight route processing unit 111 may acquire information on the imaging distance included in the input parameters. The flight route processing unit 111 may acquire information on resolution of the imaging device 220 or 230 included in the input parameters and calculate the imaging distance based on the resolution. As the imaging distance becomes shorter, a larger image with the loss area LA as the subject can be acquired, so that the shape data processing unit 113 can improve the estimation accuracy of the three-dimensional shape.

The imaging position interval related to the flight route FPB is a spatial interval (distance) between two adjacent imaging positions among a plurality of imaging positions for imaging the loss area LA at different altitudes. Here, the plurality of imaging positions are disposed along the vertical direction. The flight route processing unit 111 may decide the imaging positions based on the imaging distance and the imaging position interval. A known method may be used as a method for deciding the imaging positions based on the imaging distance and the imaging position interval. Since the imaging position is a position for imaging the loss area LA, the imaging position may be disposed outside the area of the loss area LA.

The flight route processing unit 111 generates a flight route FPB passing through each disposed imaging position CP. In a case where there are a plurality of loss areas LA, the flight route processing unit 111 may generate a plurality of flight routes FPB each passing through respective imaging positions CP for imaging one loss area LA. In the case where there are a plurality of loss areas LA, the flight route processing unit 111 may also generate one flight route FPB passing through respective imaging positions CP for imaging each loss area LA at once.

The flight route FPB may be a flight route surrounding sideways of the loss area LA. The flight route FPB may have a plurality of flight courses. Each position on the same flight course may be at the same altitude. One flight course may include a plurality of imaging positions CP. The number of images at the same altitude around the loss area LA increases by disposing a plurality of imaging positions CP at the same altitude. Therefore, the shape data processing unit 113 can improve the estimation accuracy of the three-dimensional shape related to each altitude around the loss area LA.

Figure 12:
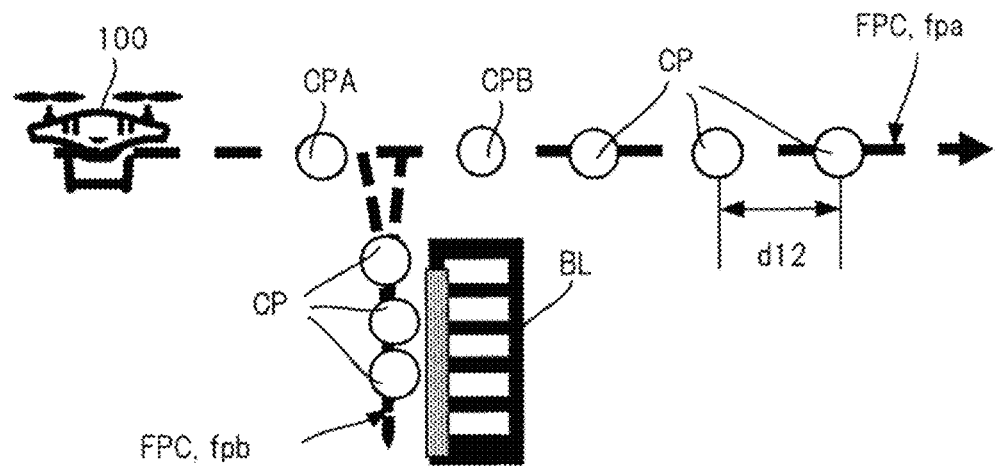
FIG. 12 is a diagram for explaining a generation example of a flight route FPC.

FIG. 12 is a diagram for explaining a generation example of the flight route FPC.

The flight route processing unit 111 may set an interval between the imaging positions CP (imaging position interval) to an interval d12 in a section corresponding to the flight route FPA in the flight route FPC. The interval d12 is an interval shorter than the interval d11 and is a dense interval. Therefore, the interval d12 is an interval at which imaging ranges at adjacent imaging positions CP are partially overlapped. The imaging at each imaging position CP at the interval d12 of the flight section fpa (flight route FPA) may be referred to as detailed imaging.

Densifying the imaging position interval means increasing the resolution. In the imaging at the dense interval d12, when maintaining the overlapping rate of the imaging ranges, as compared with imaging at the sparse interval d11, the distance with the subject becomes closer and the imaging position interval becomes shorter. For example, in the imaging at the dense interval d12, when a resolution of four times is required, as compared with imaging at the sparse interval d11 (for example, an interval of 20 m), the imaging distance is reduced to ¼ and the interval d12 is reduced to ¼ (for example, an interval of 5 m).

The flight route processing unit 111 compares position information (comprising latitude and longitude) of each imaging position CP with position information (comprising latitude and longitude) of the loss area LA1 in the flight section fpa corresponding to the flight route FPA of the flight route FPC, and specifies first and second closest imaging positions CPA and CPB at the position of the loss area LA1. The flight route processing unit 111 inserts a flight section fpb corresponding to the flight route FPB between specified imaging positions CP (CPA, CPB) in the flight section fpa. That is, the flight route processing unit 111 generates the flight route FPC in which the flight route FPB is inserted in the flight route FPA (S16). Therefore, when the unmanned aerial vehicle 100 flies in the flight section fpa and approaches the loss area LA, the flight route FPC is switched to the flight section fpb and becomes a flight route returning again to the flight section fpa after the flight of the flight section fpb.

The positions of the imaging positions CPA and CPB may not be the first and second closest positions. The imaging at each imaging position CP at the interval d12 of the flight section fpa (flight route FPA) and the imaging at each imaging position CP at the flight section fpb may be combined and referred to as detailed imaging of the flight route FPC.

Figure 13:
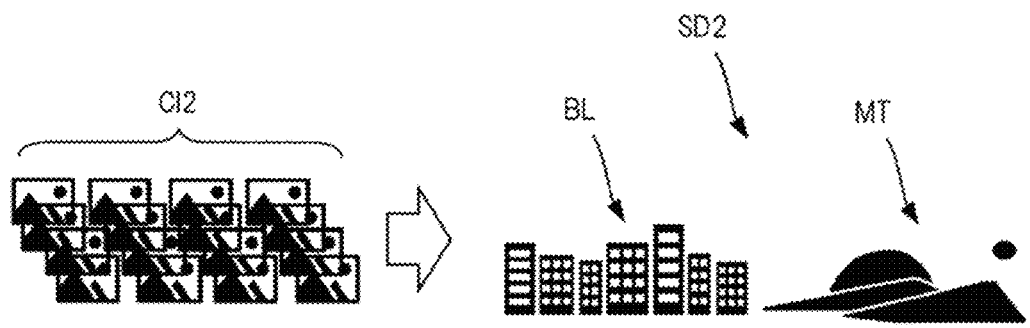
FIG. 13 is a diagram for explaining a generation example of three-dimensional shape data based on an image obtained by the flight route FPC.

FIG. 13 is a diagram for explaining a generation example of the three-dimensional shape data based on an image obtained by the flight route FPC.

The imaging control unit 112 causes the imaging device 220 or 230 to image in the vertical direction at each imaging position CP of the flight section fpa in the flight route FPC. The imaging control unit 112 causes the imaging device 220 or 230 to image in the horizontal direction toward the loss area LA at each imaging position CP of the flight section fpb in the flight route FPC. The unmanned aerial vehicle 100 can capture images in the horizontal direction or the like of the loss area LA which are difficult to be imaged in the imaging of the flight route FPA by imaging in the vertical direction and the horizontal direction of the loss area LA.

The shape data processing unit 113 generates, based on a plurality of images CI2 obtained at each imaging position of the flight route FPC, three-dimensional shape data SD (SD2). A user of the three-dimensional shape estimation system 10 can grasp a shape of the ground in the vertical direction of the flight route FPC by confirming the three-dimensional shape data obtained from the flight route FPC by displaying or the like. The shape may include a building BL such as a building or a huge parabola antenna, in addition to the scenery of the mountain M, rivers or the like. Therefore, the unmanned aerial vehicle 100 can present the approximate shape of the ground in the vertical direction of the flight section fpa on the flight route FPC, and can further present a shape (for example, a shape of a building in the loss area LA1) of the loss area LA1 in the horizontal direction of the flight section fpb. The three-dimensional shape data SD2 is an example of second three-dimensional shape data in the flight range.

Figure 14:
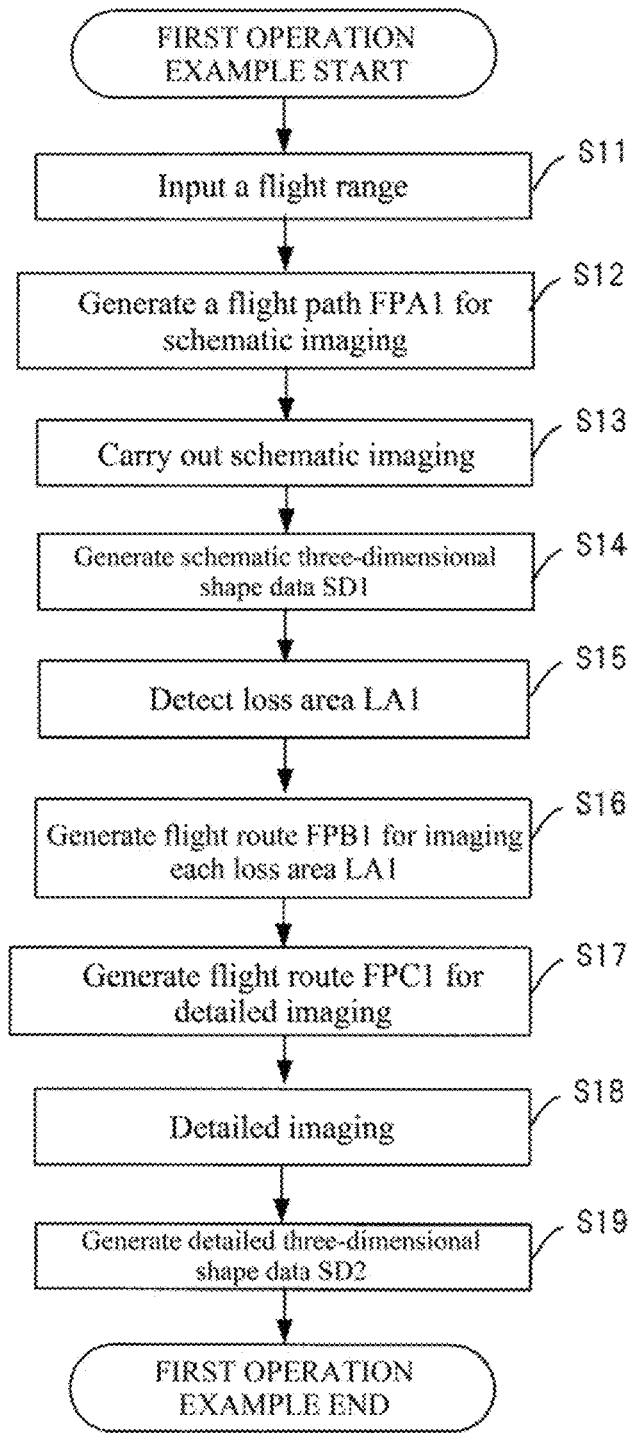
FIG. 14 is a flowchart showing a first operation example of the three-dimensional shape estimation system.

FIG. 14 is a flowchart showing a first operation example of the three-dimensional shape estimation system 10.

In the transmitter 50, the parameter operation unit OPA inputs information on a flight range A1.

In the unmanned aerial vehicle 100, the flight route processing unit 111 receives information on the flight range A1 from the transmitter 50 via the communication interface 150 to acquire the information on the flight range A1 (S11). The information on the flight range A1 may be stored in the memory 160.

The flight route processing unit 111 generates the flight route FPA (FPA1) in which the imaging position interval is the interval d11, that is, the imaging position interval is sparse (S12). The information on the flight route FPA1 may be stored in the memory 160.

The imaging control unit 112 causes the imaging device 220 or 230 to capture images in the vertical direction at each imaging position CP of the flight route FPA1 (S13). The imaging is schematic imaging. The images CI (CI1) obtained in S13 may be stored in the memory 160.

The shape data processing unit 113 generates, based on the plurality of images CI1 obtained in S13, the three-dimensional shape data SD (SD1) (S14). The three-dimensional shape data SD1 may be stored in the memory 160.

The loss area detecting unit 114 detects the loss area LA (LA1) in the generated three-dimensional shape data SD1 (S15). The loss area detecting unit 114 acquires position information on the loss area LA1. The loss area detecting unit 114 may acquire information on the position (for example, latitude, longitude and altitude) of the loss area LA1 in the three-dimensional space and store the information in the memory 160.

The flight route processing unit 111 generates the flight route FPB (FPB1) for imaging the loss area LA1 (S16). The flight route FPB1 is the flight section fpb included in the flight route FPC. The information on the generated flight route FPB1 (flight section fpb1) may be stored in the memory 160.

The flight route processing unit 111 generates the flight route FPC (FPC1) comprising the flight section fpa (fpa1) in which the imaging position interval is interval d12 and dense and the flight section fpb (fpb1) generated in S16 (S17). The flight route FPC1 is a flight route for detailed imaging. The information on the generated flight route FPC may be stored in the memory 160. That is, the flight route FPC1 includes the flight section fpa (fpa1) corresponding to the original flight route FPA1. When approaches the loss area LA1 according to the route of the flight section fpa1 at the time of flying again after the schematic image pickup at S13, the unmanned aerial vehicle 100 transits to the flight section fpb1 corresponding to the flight route FPB1 and descends at the imaging point of the loss area LA1.

The flight control unit 115 controls the flight of the unmanned aerial vehicle 100 according to the flight route FPC1. The imaging device 220 or 230 are caused to capture images at each imaging position CP of the flight route FPC1 (S18). The images CI (CI2) obtained in S18 may be stored in the memory 160. The imaging is detailed imaging of the flight route FPC1. In the imaging in S18, the imaging at the flight section fpa1 of the flight route FPC1 may be the schematic imaging which is performed at the sparse interval d11 rather than the detailed imaging which is performed at the dense interval d12.

The shape data processing unit 113 generates, based on the plurality of images CI2 obtained in S18, the three-dimensional shape data SD2 (S19). The three-dimensional shape data SD2 may be stored in the memory 160.

According to the first operation example of the three-dimensional shape estimation system 10, the unmanned aerial vehicle 100 can image the vertical direction in which the ground exists and the horizontal direction of the loss area LA1 since the images are captured at each imaging position of the flight route FPC comprising the flight section fpa and the flight section fpb. Therefore, the unmanned aerial vehicle 100 can acquire the three-dimensional shape data SD2 of the periphery around the loss area LA1, and can estimate the three-dimensional shape around the loss area LA. In addition, the unmanned aerial vehicle 100 can acquire the three-dimensional shape data SD2 of the entire flight range A1, and can estimate the three-dimensional shape of the entire flight range A1.

In addition, in the unmanned aerial vehicle 100, the imaging position interval according to the schematic imaging is made to be shorter than the imaging position interval according to the detailed imaging for the flight route FPA or the flight section fpa, so that the imaging time related to the schematic imaging can be reduced, and the flight time of the flight route FPA1 can be reduced. In the unmanned aerial vehicle 100, the imaging position interval according to the schematic imaging is made to be shorter than the imaging position interval related to the detailed imaging, so that the number of images captured by the detailed imaging can be increased; and the increased number of images are used for generating the three-dimensional shape data, so that the restoration accuracy of the three-dimensional shape can be improved.

Figure 15:
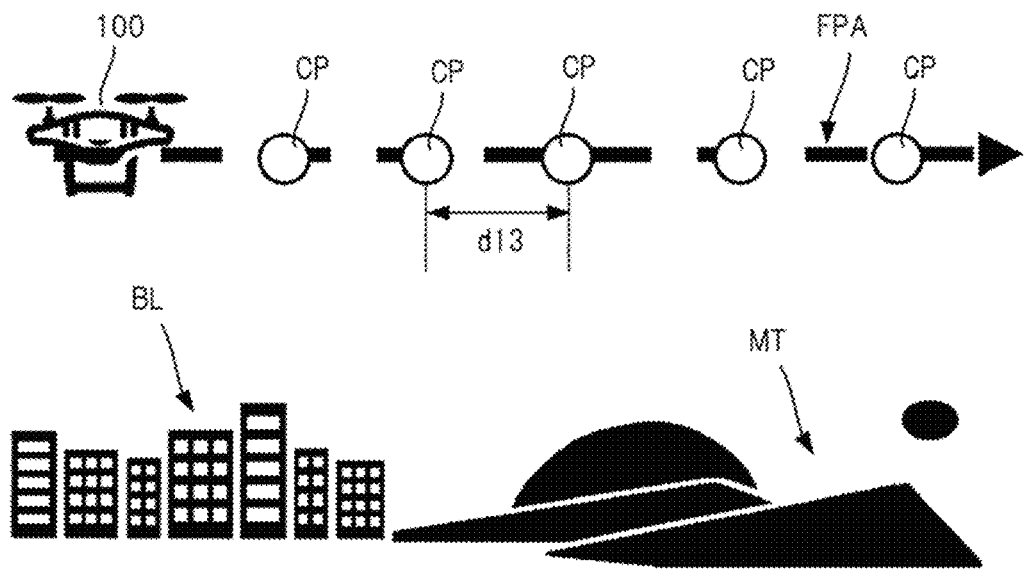
FIG. 15 is a diagram for explaining detailed imaging on the flight route FPA.

FIG. 15 is a diagram for explaining the detailed imaging on the flight route FPA.

The flight route processing unit 111 may set intervals between the respective imaging positions CP (imaging position interval) to interval d13 in the flight route FPA. The flight route processing unit 111 may set the intervals between respective imaging positions CP to the interval d13 in the flight route FPA. The interval d13 may be shorter than the interval d11, and may be as long as the interval d12. That is, the flight route processing unit 111 may set the intervals of the respective imaging positions CP to dense intervals.

Therefore, the interval d12 is an interval at which imaging ranges at adjacent imaging positions CP are partially overlapped. The flight route FPA may be used in overall imaging for imaging over the entire flight range A1.

In addition, the flight route processing unit 111 may acquire information on resolution of the imaging device 220 or 230 included in the input parameters and calculate, based on the information of the resolution, the interval d13 of respective imaging positions CP. A known method may be used as a method for calculating the interval d13 of respective imaging positions based on the information of the resolution. Further, the information on the interval d13 may be included in the input parameters and received from the transmitter 50. The imaging at each imaging position CP at the interval d13 of the flight route FPA may be referred to as detailed imaging. The unmanned aerial vehicle 100 can acquire a large number of images by imaging at dense intervals. In the vertical direction (the direction toward the ground) of the flight route on which the unmanned aerial vehicle 100 flies, scenery comprising a building BL and a mountain MT may spread. Therefore, the building BL and the mountain MT are in the imaging range and become imaging targets.

Figure 16:
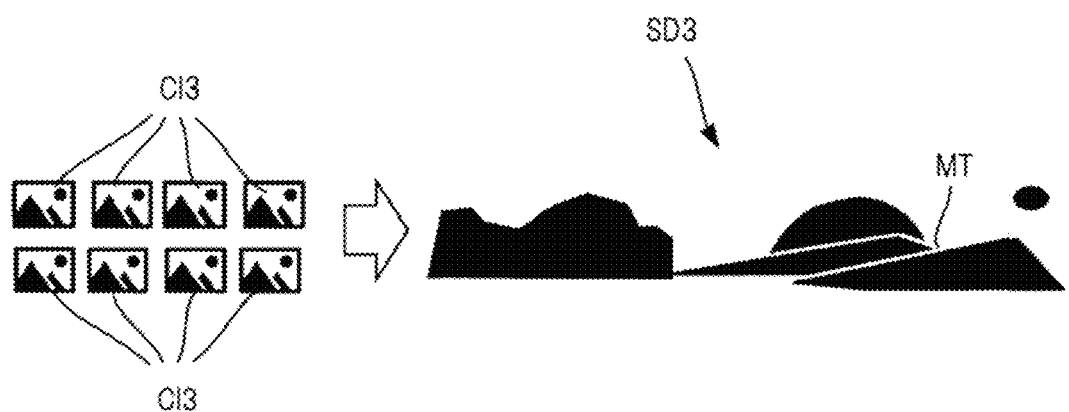
FIG. 16 is a diagram for explaining generation of three-dimensional shape data based on the detailed imaging obtained by the flight route FPA.

FIG. 16 is a diagram for explaining generation of three-dimensional shape data based on the detailed imaging obtained by the flight route FPA.

The shape data processing unit 113 generates, based on a plurality of images CI3 obtained at each imaging position CP by detailed imaging of the flight route FPA, three-dimensional shape data SD3. A user of the three-dimensional shape estimation system 10 can grasp a shape of the ground in the vertical direction of the flight route FPA by confirming the three-dimensional shape data SD3 by displaying or the like. The shape includes scenes such as mountain MT and rivers. Accordingly, although there is a possibility that a loss area may occur, the unmanned aerial vehicle 100 can restore, based on the images CI3, the approximate three-dimensional shape in the flight range A1. The three-dimensional shape data SD3 may be stored in the memory 160. Here, the shape data processing unit 113 can generate, based on the images CI3 at respective imaging positions CP which are disposed at dense intervals, the three-dimensional shape data SD3. Therefore, in the three-dimensional shape data SD3, the contour of the mountain MT is more clearly presented than in the three-dimensional shape data SD1 based on sparse schematic imaging. However, even at dense intervals, since the images are captured at each imaging position CP of the flight route FPA3 traveling in the horizontal direction in the sky, it is difficult for the unmanned aerial vehicle 100 to image the lateral surface of the building BL or the like.

Figure 17:
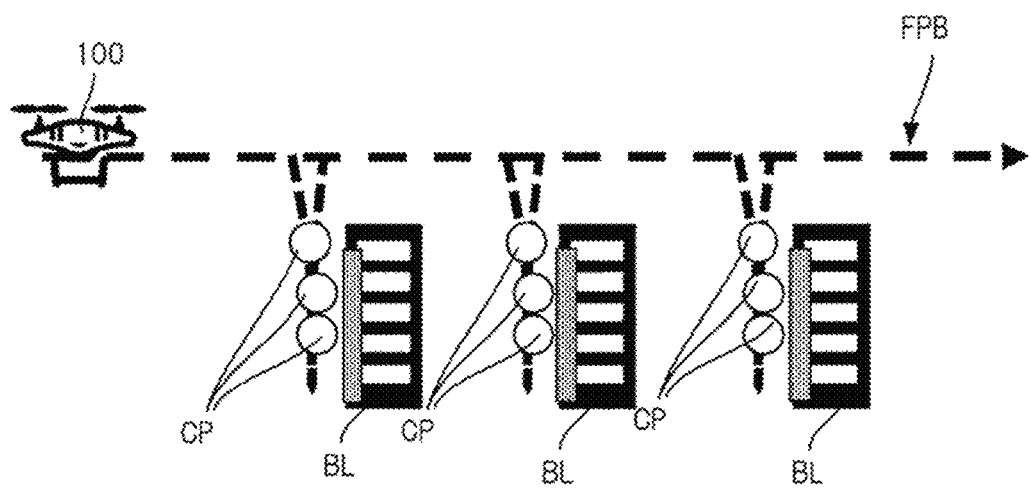
FIG. 17 is a diagram for explaining the flight route FPB for imaging a plurality of loss areas.

FIG. 17 is a diagram for explaining the flight route FPB for imaging a plurality of loss areas LA.

The flight route processing unit 111 generates a flight route FPB passing through each disposed imaging position CP. There are a plurality of loss areas LA in FIG. 17, the flight route processing unit 111 generates one flight route FPB passing through respective imaging positions CP for imaging each loss area LA at once. In FIG. 17, the area of the building BL is shown as the loss area LA. The flight route FPB may include a section (horizontal section) in which the unmanned aerial vehicle 100 fly in the horizontal direction, but no imaging position is provided in the horizontal section and the image is not captured in the horizontal section. In other words, the flight route processing unit 111 generates the flight route FPB (FPB2) as an imaging route for imaging only the loss area LA without following the original flight route FPA (FPA3). That is, the flight route processing unit 111 generates the flight route FPB (FPB2) by connecting the imaging positions CP for imaging the loss area LA without passing through the imaging positions CP in the horizontal direction.

Figure 18:
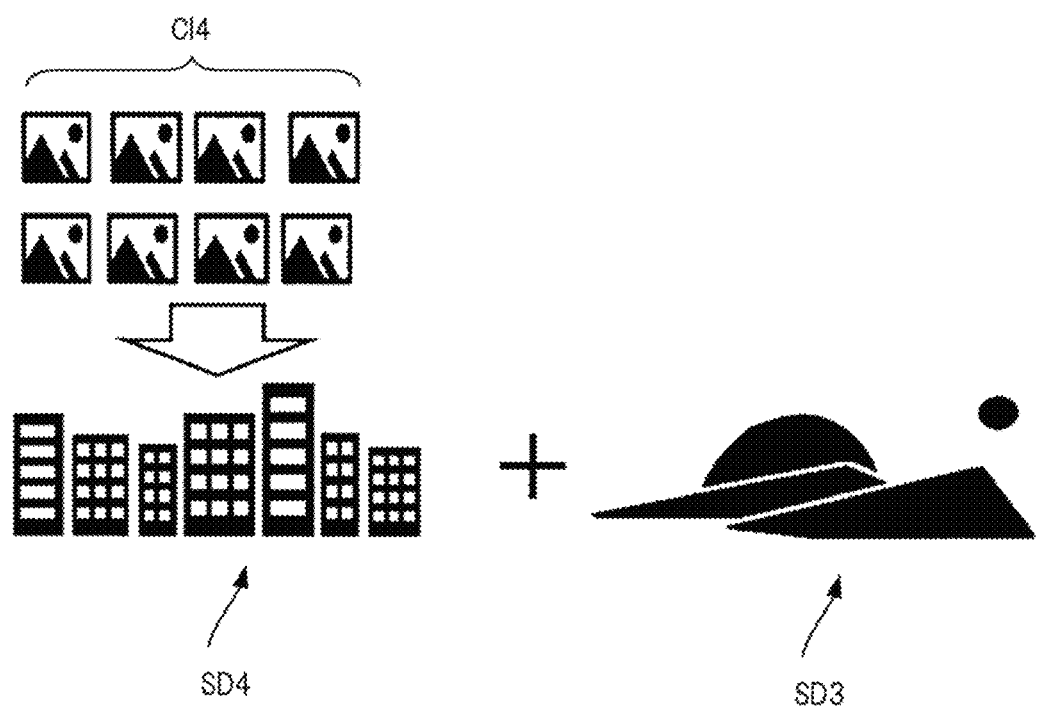
FIG. 18 is a diagram for explaining generation of three-dimensional shape data based on an image of the loss areas and synthesis of a plurality of three-dimensional shape data.

FIG. 18 is a diagram for explaining generation of three-dimensional shape data based on the images of the loss area LA and synthesis of a plurality of three-dimensional shape data.

The shape data processing unit 113 generates, based on a plurality of images CI4 obtained at each imaging position CP of the flight route FPB, three-dimensional shape data SD4. On the flight route FPB, the horizontal direction of the loss area LA is imaged. Therefore, a user of the three-dimensional shape estimation system 10 can grasp the three-dimensional shape (for example, a shape of the building BL in the loss area LA) of the periphery around the loss area LA by confirming the display based on the three-dimensional shape data SD4.

The shape data processing unit 113 may synthesize a plurality of three-dimensional shape data. For example, the shape data processing unit 113 may synthesize the three-dimensional shape data SD3 based on the detailed imaging obtained by the flight route FPA, and the three-dimensional shape data SD4 based on images of the loss area LA obtained by the flight route FPB. When synthesizing the plurality of three-dimensional shape data, the shape data processing unit 113 may synthesize by comparing feature points of the respective three-dimensional shape data SD3, SD4 and matching similar feature points. That is, the shape data processing unit 113 may perform registration on the respective three-dimensional shape data SD3, SD4. This registration may be a rigid body registration. In the rigid body registration, the generated three-dimensional shape data SD3, SD4 are aligned without changes in shape.

Figure 19:
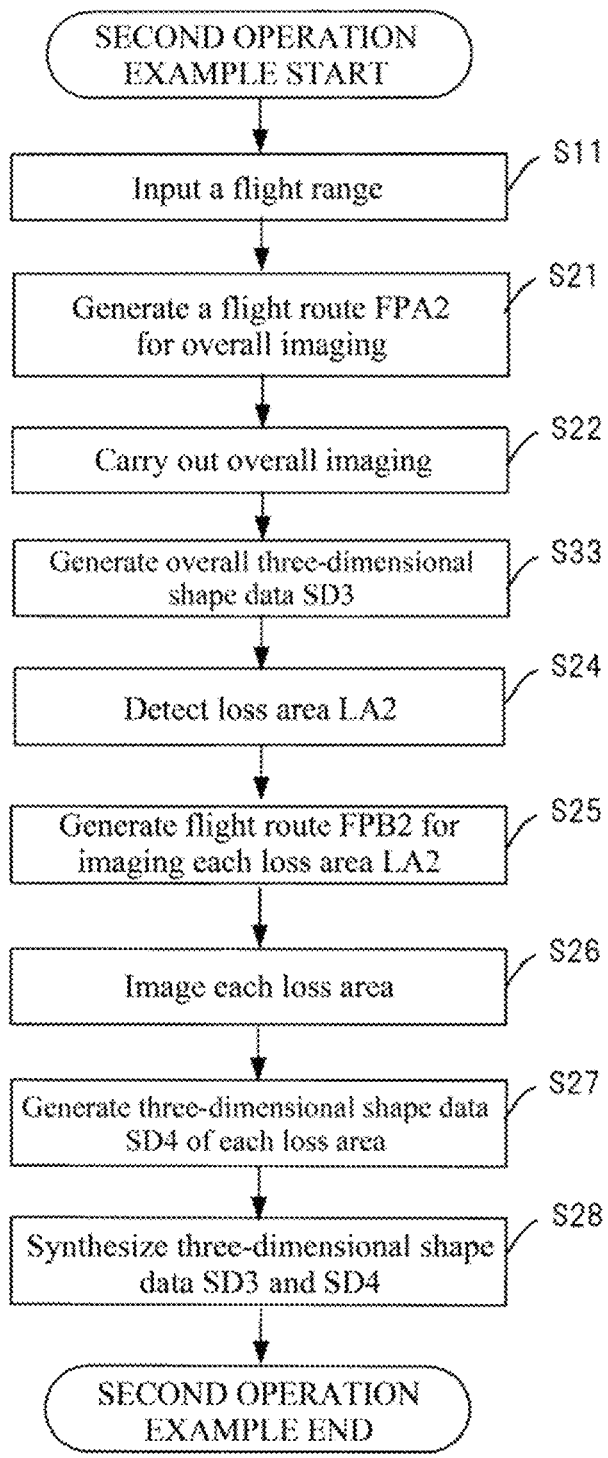
FIG. 19 is a flowchart showing a second operation example of the three-dimensional shape estimation system.

FIG. 19 is a flowchart showing a second operation example of the three-dimensional shape estimation system 10. In FIG. 19, the same step number is given to the same processing as the processing of FIG. 14, and the description is simplified or omitted.

First, the flight route processing unit 111 performs the processing in S11 of FIG. 14.

After the processing in S11, the flight route processing unit 111 generates a flight route FPA (FPA2) in which the imaging position interval is the interval d13, that is, the imaging position interval is dense (S22). The flight route FPA2 is a flight route for overall imaging. The information on the flight route FPA2 may be stored in the memory 160.

The imaging control unit 112 causes the imaging device 220 or 230 to capture images in the vertical direction at each imaging position CP of the flight route FPA2 (S22). The imaging may be referred to as overall imaging. The images CI (CI3) obtained in S22 may be stored in the memory 160.

The shape data processing unit 113 generates, based on the plurality of images CI3 obtained in S22, the three-dimensional shape data SD (SD3) (S23). The three-dimensional shape data SD3 may be stored in the memory 160.

The loss area detecting unit 114 detects a loss area LA (LA2) in the generated three-dimensional shape data SD3 (S24). The loss area detecting unit 114 acquires position information on the loss area LA2. The loss area detecting unit 114 may acquire information on the position (for example, latitude, longitude and altitude) of the loss area LA2 in the three-dimensional space and store the information in the memory 160.

The flight route processing unit 111 generates the flight route FPB (FPB2) for imaging the loss area LA2 (S25). The information on the flight route FPB2 may be stored in the memory 160.

After the processing in S25, the flight control unit 115 causes flight of the unmanned aerial vehicle 100 according to the flight route FPB2 generated in S15. The imaging control unit 112 causes the imaging device 220 or 230 to capture images in the horizontal direction toward the loss area LA2 in each imaging position CP of the flight route FPB2 (S26). The images CI (CI4) obtained in S26 may be stored in the memory 160.

The shape data processing unit 113 generates, based on a plurality of images CI4 imaged at each imaging position CP of the flight route FPB2, three-dimensional shape data SD (SD4) (S27). The three-dimensional shape data SD4 obtained in S27 may be stored in the memory 160.

The shape data processing unit 113 synthesizes the three-dimensional shape data SD3 obtained in S23 and the three-dimensional shape data SD4 obtained in S27 (S28). The three-dimensional shape data synthesized in S28 will be referred to as SD3+SD4. The synthesized three-dimensional shape data (SD3+SD4) is an example of third three-dimensional shape data in the flight range.

According to the second operation example of the three-dimensional shape estimation system 10, the unmanned aerial vehicle 100 can acquire the three-dimensional shape data SD4 of the periphery around the loss area LA2 and estimate the three-dimensional shape around the loss area LA1. In addition, the unmanned aerial vehicle 100 can acquire the three-dimensional shape data (SD3+SD4) of the entire flight range A1, and can estimate the three-dimensional shape of the entire flight range A1. A user of the three-dimensional shape estimation system 10 can grasp a shape of the ground in the vertical direction of the flight route FPC1 and a shape of the building BL or the like included in the loss area LA2, by confirming the synthesized three-dimensional shape data (SD3+SD4) by displaying or the like. In addition, the unmanned aerial vehicle 100 can use the images CI3 in the vertical direction obtained by overall imaging for generation of the three-dimensional shape data, thereby improving the utilization efficiency of the images.

Figure 20:
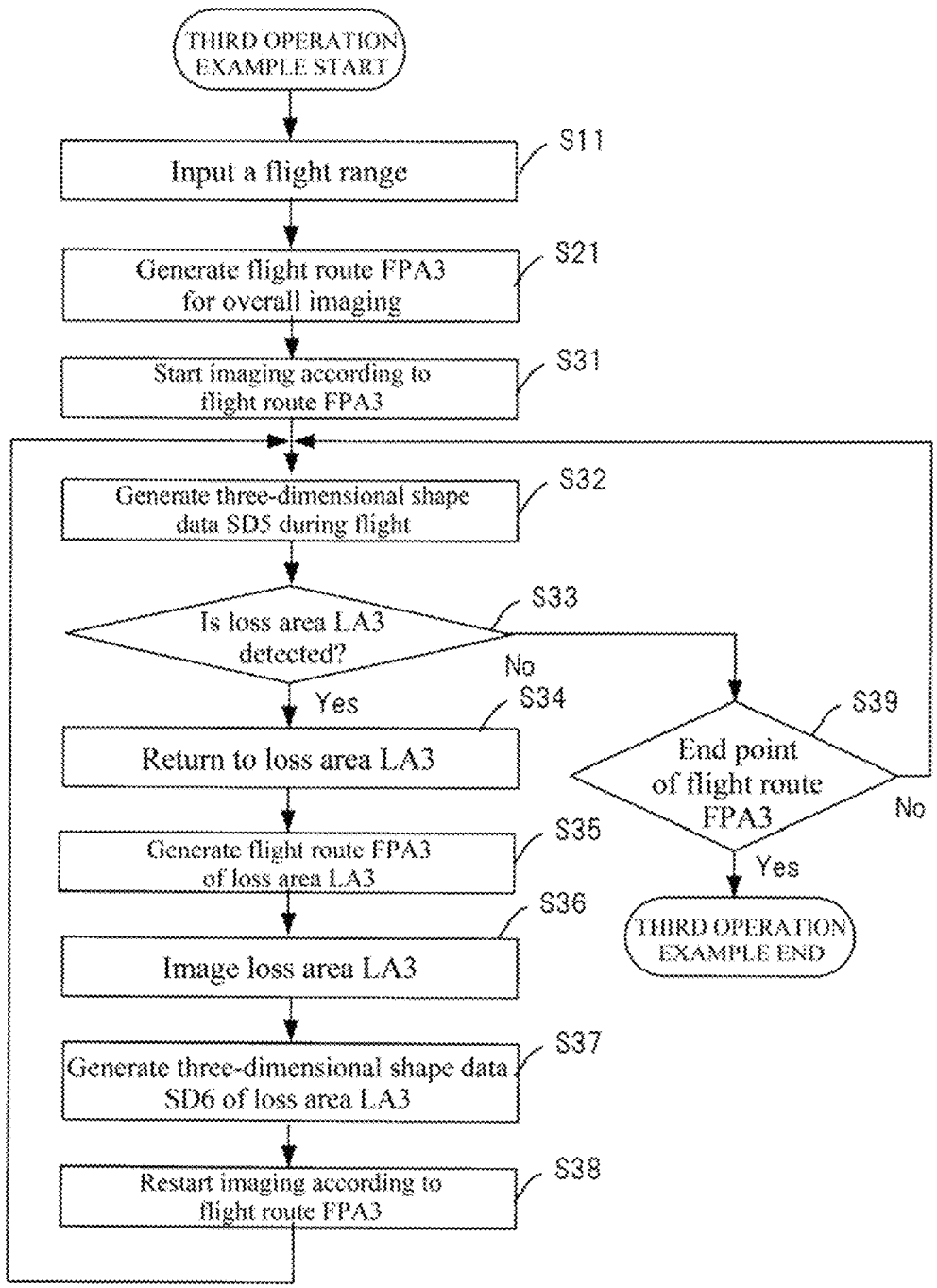
FIG. 20 is a flowchart showing a third operation example of the three-dimensional shape estimation system.

FIG. 20 is a flowchart showing a third operation example of the three-dimensional shape estimation system 10. In FIG. 20, the same step number is given to the same processing as the processing of FIG. 14 and FIG. 19, and the description is simplified or omitted.

First, the flight route processing unit 111 performs the processing in S11 of FIG. 14. The flight route processing unit 111 performs the processing in S21 of FIG. 19 to generate a flight route FPA (FPA3).

The flight control unit 115 starts flight according to the flight route FPA3. The imaging control unit 112 causes the imaging device 220 or 230 to start imaging in the vertical direction at each imaging position CP of the flight route FPA3 (S31). The images CI (CI5) obtained in S31 may be stored in the memory 160.

The shape data processing unit 113 generates, based on the plurality of images CI5 obtained in S31 during the flight according to flight route FPA3, three-dimensional shape data SD (SD5) (S32). The shape data processing unit 113 may generate the three-dimensional shape data SD5 when the number of images CI5 stored in the memory 160 becomes equal to or greater than a predetermined number. During each predetermined period from the start of imaging in S32, the shape data processing unit 113 may generate, based on a plurality of images CI5 captured in the predetermined period, the three-dimensional shape data SD5. During each predetermined period from the start of imaging in S32, the shape data processing unit 113 may generate, based on a plurality of images CI5 stored from the start of the imaging, the three-dimensional shape data SD5.

The loss area detecting unit 114 determines whether there is a loss area LA (LA3) in the three-dimensional shape data SD5 generated in S32 (S33). In a case where it is determined that there is a loss area LA3, the flight control unit 115 causes the unmanned aerial vehicle 100 to leave the flight route FPA3 and fly toward the loss area LA3. The existence of the loss area LA3 may be determined at the imaging position of the preset flight route FPA3 or may be determined at the imaging position where the imaging of a certain region is completed.

During the flight toward the loss area LA3, the flight route processing unit 111 generates a flight route FPB (FPB3) for imaging the loss area LA3 (S35). In the third operation example, the three-dimensional shape data SD5 is sequentially generated during the flight, so the possibility that a plurality of loss areas LA3 exist is lower than the first operation example and the second operation example.

The flight control unit 115 controls the flight of the unmanned aerial vehicle 100 according to the flight route FPB3. The imaging control unit 112 controls the imaging device 220 or 230 to capture images in the horizontal direction toward the loss area LA3 at each imaging position CP of the flight route FPB2 (S36). The images CI (CI6) obtained in S36 may be stored in the memory 160.

When the imaging at the imaging positions CP of the flight route FPB3 is completed and the flight of the flight route FPB3 is completed, the flight control unit 115 returns the unmanned aerial vehicle 100 to the flight according to the flight route FPA3. The flight control unit 115 may fly and return at the shortest distance from an end point of the flight route FPB3 to a position included in the flight route FPA3. The position information of the end point of the flight route FPB3 may be acquired via the GPS receiver 240.

The unmanned aerial vehicle 100 returns to the original flight route FPA3 from the flight route FPB3 related to the loss area LA3, so that the unmanned aerial vehicle 100 can continuously fly the flight route FPA3 without returning to a predetermined point after imaging of the loss area LA3. Therefore, the unmanned aerial vehicle 100 can continue to capture images at each imaging position CP of the flight route FPA3.

In the process of returning from the flight route FPB3 to the flight route FPA3 or after returning to the flight route FPA3, the shape data processing unit 113 may generate, based on a plurality of images CI6 imaged at each imaging position CP of the flight route FPB3, three-dimensional shape data SD (SD6) of the loss area LA3 (S37). Since the horizontal direction of the loss area LA3 is imaged on the flight route FPB3, the unmanned aerial vehicle 100 can grasp the three-dimensional shape (for example, a shape of a building BL in the loss area LA3) of the periphery around the loss area LA3. The three-dimensional shape data SD6 obtained in S37 may be stored in the memory 160.

Accordingly, during the flight of the unmanned aerial vehicle 100, the unmanned aerial vehicle 100 can acquire the three-dimensional shape data SD6 of the periphery around the loss area LA3 and estimate the three-dimensional shape around the loss area LA3. Therefore, the unmanned aerial vehicle 100 does not return while operating from the detection of the loss area LA3 until the generation of the three-dimensional shape data SD6, so that the time required from the start of flight of the unmanned aerial vehicle 100 to the acquisition of the three-dimensional shape data SD6 of the loss area LA3 can be shortened and the real time property can be improved.

The flight control unit 115 resumes the flight according to the flight route FPA4 from the return point of the flight route FPA3. The imaging control unit 112 controls the imaging device 220 or 230 to resume imaging in the vertical direction at each imaging position CP of the flight route FPA3 (S38). The images CI (CI7) obtained in S38 may be stored in the memory 160. After the processing in S38, the UAV control unit 110 proceeds to S32.

On the flight route FPA3, the imaging control unit 112 does not have to capture an image at each imaging position that has been imaged before heading to the flight route FPB3. That is, on the flight route FPA3, the imaging device 220 or 230 may only capture an image at the imaging position CP that has not been imaged.

Accordingly, the unmanned aerial vehicle 100 cannot capture images at the imaging positions CP between a departure point from the flight route FPA3 to the flight route FPB3 and the return point from the flight route FPB3 to the flight route FPA3. Therefore, the number of images captured by the unmanned aerial vehicle 100 between the departure point from the flight route FPA3 to the flight route FPB3 and the return point from the flight route FPB3 to the flight route FPA3 can be reduced, and thus, a processing load of the UAV control unit 110 can be reduced.

In addition, in the process of returning from the flight route FPB3 to the flight route FPA3 or after returning to the flight route FPA3, the shape data processing unit 113 may synthesize the three-dimensional shape data SD (SD7) related to the flight route FPA3 and the three-dimensional shape data SD6 of the periphery around the loss area LA6, and generate three-dimensional shape data (SD6+SD7) in a range where the images obtained by the unmanned aerial vehicle 100 in the flight range A1 are obtained. The three-dimensional shape data (SD6+SD7) is an example of fourth three-dimensional shape data.

Accordingly, during the flight of the unmanned aerial vehicle 100, the unmanned aerial vehicle 100 can acquire the three-dimensional shape data SD7 of the entire flight range A1, and can estimate the three-dimensional shape of the entire flight range A1. Therefore, the unmanned aerial vehicle 100 can reduce the time required from the start of flight of the unmanned aerial vehicle 100 to the acquisition of the three-dimensional shape data SD7 of the entire flight range A1 so as to improve the real time property.

In addition, in stead of synthesizing the three-dimensional shape data SD6 and SD7, the shape data processing unit 113 may generate, based on a plurality of images CI5, CI6 and CI7 stored in the memory 160 or the like from the start of the flight of the unmanned aerial vehicle 100, the three-dimensional shape data SD7. In this case, synthesis of the three-dimensional shape data SD is not necessary.

In a case where the loss area LA3 is not detected in S34, the flight control unit 115 determines whether the unmanned aerial vehicle 100 has arrived at the end point of the flight route FPA3 (S39). For example, the flight control unit 115 may determine that the unmanned aerial vehicle 100 has arrived at the end point of the flight route FPA3 when position information of the end point of the flight route FPA3 and the information on the position where the unmanned aerial vehicle 100 exists obtained by the GPS receiver 240 or the like are the same or within a predetermined distance. In a case where the unmanned aerial vehicle 100 has not arrived at the end point of the flight route FPA3, the process proceeds to S32. In a case where the unmanned aerial vehicle 100 has arrived at the end point of the flight route FPA3, the processing in FIG. 20 is completed.

According to the third operation example of the three-dimensional shape estimation system 10, the unmanned aerial vehicle 100 can generate, based on a plurality of images CI obtained by the imaging device 220 or 230, the three-dimensional shape data SD during flight. The unmanned aerial vehicle 100 may transfer the generated three-dimensional shape data SD to a display terminal (for example, the transmitter 50, PC, tablet, smart phone) during the flight of the unmanned aerial vehicle 100 via the communication interface 150. A user of the display terminal can easily and quickly confirm the three-dimensional shape of the loss area LA or the flight range A1 of the unmanned aerial vehicle 100 during the flight of the unmanned aerial vehicle 100 by confirming display data based on the three-dimensional shape data SD.

As described above, the unmanned aerial vehicle 100 acquires the input parameters input by the transmitter 50. The unmanned aerial vehicle 100 generates, based on a plurality of images CI obtained by imaging in the vertical direction at each imaging position CP of the flight route FPA traveling in the horizontal direction, the three-dimensional shape data SD. The unmanned aerial vehicle 100 detects the loss area LA based on the three-dimensional shape data SD and generates, based on the plurality of images CI obtained by imaging the loss area LA in the horizontal direction, the three-dimensional shape data SD of the periphery around the loss area LA.

Accordingly, the three-dimensional shape estimation system 10 and the unmanned aerial vehicle 100 acquires a lot of images captured in the horizontal direction toward the loss area LA which can not be obtained simply by flying over the sky and aerial photographing while uniformly passing through a fixed route. Therefore, the three-dimensional shape estimation system 10 and the unmanned aerial vehicle 100 can increase the number of the images used for three-dimensional restoration in the loss area LA, and can improve the restoration accuracy of the three-dimensional shape of periphery around an object such as the building BL included in the loss area LA.

The photographer does not have to grip the imaging device and manually capture images in order to image the loss area LA since the flight route FLB for imaging the loss area LA is generated and the unmanned aerial vehicle 100 captures images at each imaging position CP of the flight route FLB. Therefore, it is not necessary for a user who intends to capture images around the loss area LA to move to the periphery of the loss area LA and capture the images, thereby improving the user convenience. In addition, the possibility that the three-dimensional shape estimation system 10 and the unmanned aerial vehicle 100 can acquire images in a desired state (for example, a desired imaging position of the subject, a desired imaging size of the subject, and a desired imaging direction of the subject) increases, and it is possible to reduce dispersion in images due to manual imaging.

In addition, it is possible to generate the imaging positions and the flight route for the unmanned aerial vehicle 100 to capture images of the loss area LA without requiring user input of the three-dimensional spatial position (latitude, longitude and altitude) around the loss area LA, so that the user convenience is improved.

In the embodiments described above, the unmanned aerial vehicle executes various processes (for example, the generation of the flight route, the detection of the loss area, and the generation of the three-dimensional shape data) for generating the three-dimensional shape data. In some other embodiments, a device (for example, a transmitter) other than the unmanned aerial vehicle can execute the various processes for generating three-dimensional shape data, as described in more detail below.

Figure 21:
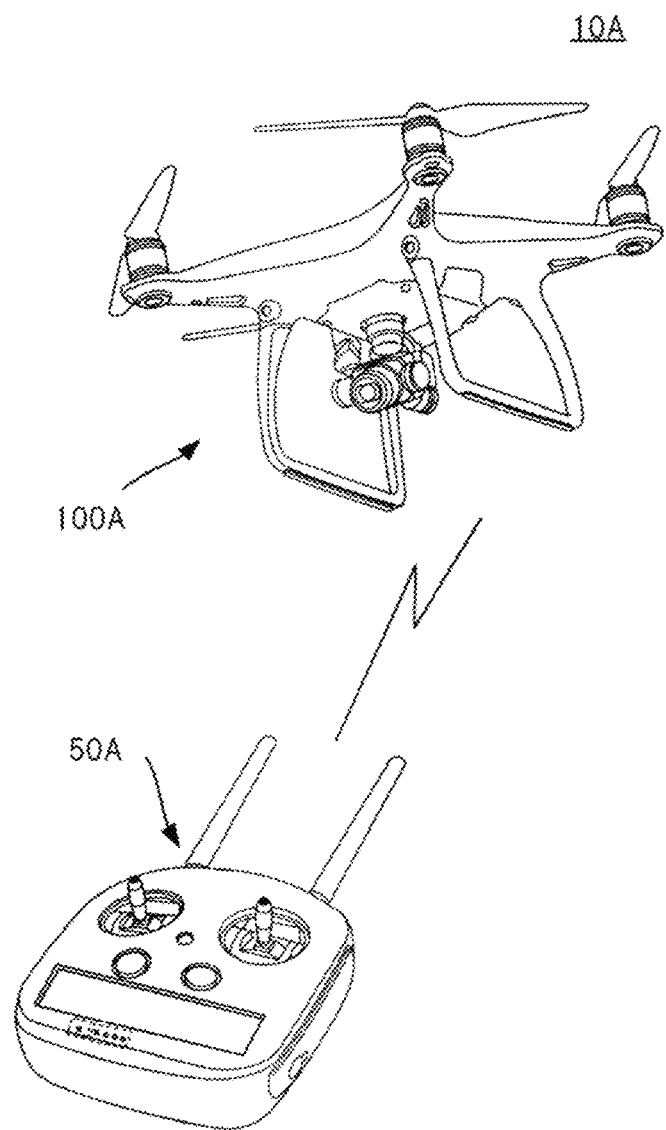
FIG. 21 is a pattern diagram showing a configuration example of a three-dimensional shape estimation system according to another embodiment.

FIG. 21 is a pattern diagram showing a configuration example of a three-dimensional shape estimation system 10A according to another embodiment. The three-dimensional shape estimation system 10A includes an unmanned aerial vehicle 100A and a transmitter 50A. The unmanned aerial vehicles 100A and the transmitter 50A can communicate with each other by wired communication or wireless communication (for example, a wireless local area network (LAN), Bluetooth®). In the description below, the description of the configuration similar to that of the embodiments above will be omitted or simplified.

Figure 22:
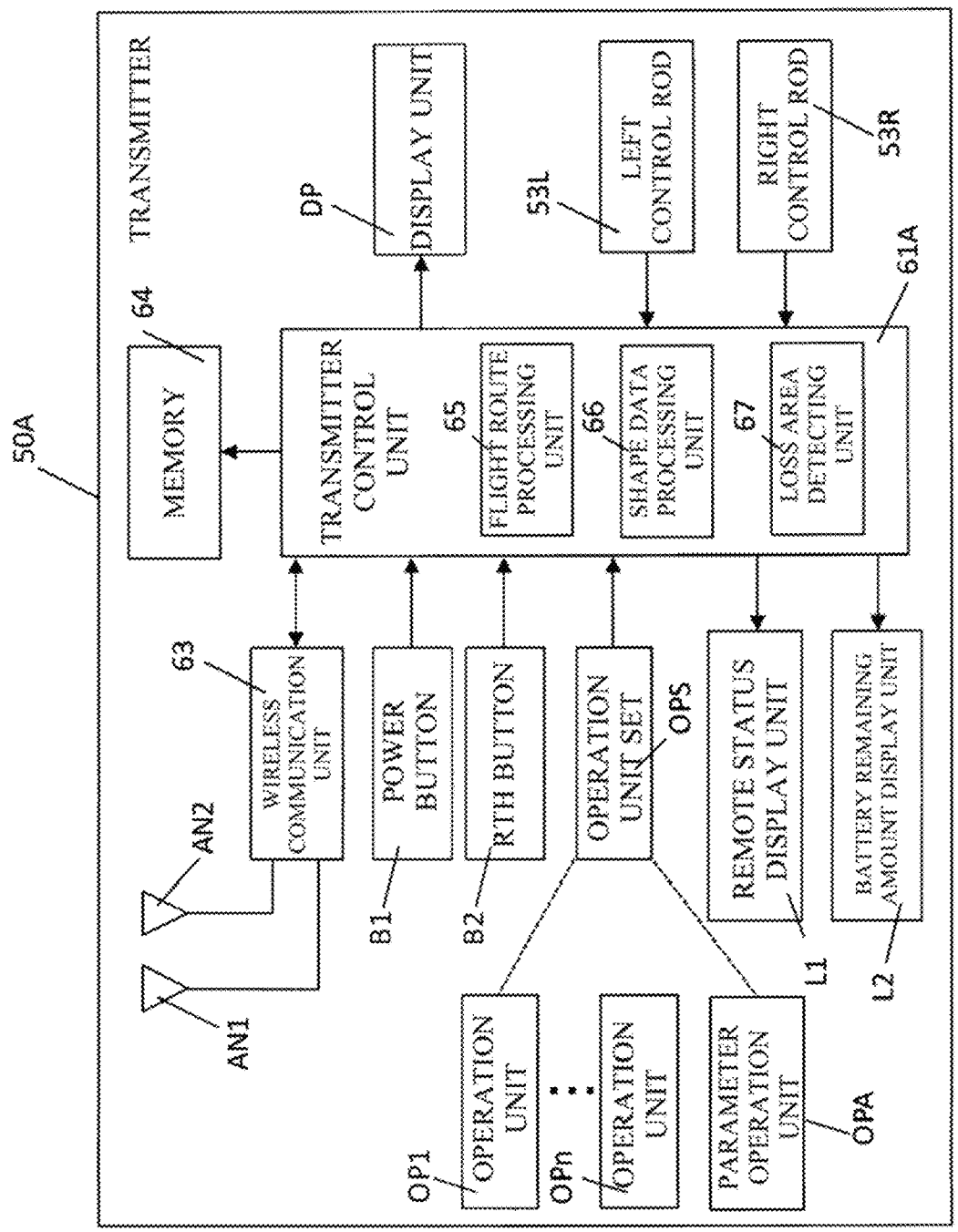
FIG. 22 is a block diagram showing an example of a hardware configuration of the transmitter.

FIG. 22 is a block diagram showing an example of a hardware configuration of the transmitter 50A. The transmitter 50A includes a transmitter control unit 61A instead of the transmitter control unit 61 compared with the transmitter 50. In the transmitter 50A shown in FIG. 22, the same components as those of the transmitter 50 shown in FIG. 6 are denoted by the same reference numerals, and the descriptions thereof are omitted or simplified.

The transmitter control unit 61A includes, in addition to the functions of the transmitter control unit 61, a function as a flight route processing unit 65 that performs processing related to generation of a flight route, a function as a shape data processing unit 66 that performs processing related to generation of three-dimensional shape data, and a function as a loss area detecting unit 67 that performs processing related to detection of a loss area. The flight route processing unit 65 is similar to the flight route processing unit 111 of the UAV control unit 110 of the unmanned aerial vehicle 100 described above. The shape data processing unit 66 is similar to the shape data processing unit 113 of the UAV control unit 110 of the unmanned aerial vehicle 100 in the first embodiment. The loss area detecting unit 67 is similar to the flight route processing unit 114 of the UAV control unit 110 of the unmanned aerial vehicle 100 described above.

The flight route processing unit 65 receives input parameters input by the parameter operation unit OPA. The flight route processing unit 65 stores the input parameters in the memory 64 as necessary. The flight route processing unit 65 reads at least a part of the input parameters from the memory 64 as necessary (for example, when deciding an imaging position, and when generating a flight route).

The memory 64 stores programs or the like necessary for controlling each unit in the transmitter 50A. The memory 64 stores programs or the like necessary for the transmitter control unit 61A to operate the flight route processing unit 65, the shape data processing unit 66 or the loss area detecting unit 67. The memory 64 may be a computer-readable recording medium, and may include at least one of a flash memory such as a static random access memory (SRAM), a dynamic random access memory (DRAM), an erasable programmable read only memory (EPROM), an electrically erasable programmable read-only memory (EEPROM), and a USB memory. The memory 64 may be provided in the transmitter 50A. The memory 64 may be detachably provided from the transmitter 50A.

The flight route processing unit 65 may decide the imaging position CP and generate the flight routes FPA, FPB and FPC in a manner similar to the flight route processing unit 111 described above. The flight route processing unit 65 may transmit the information on the decided imaging position and information on the flight routes to the unmanned aerial vehicle 100A via the wireless communication unit 63.

The shape data processing unit 66 may receive and acquire images captured at each imaging position of the flight route by the unmanned aerial vehicle 100A via the wireless communication unit 63. The received images may be stored in the memory 64. The shape data processing unit 66 may generate, based on the acquired images, the three-dimensional shape data. The generated three-dimensional shape data may be stored in the memory 64.

The loss area detecting unit 67 detects a loss area in the three-dimensional shape data.

Figure 23:
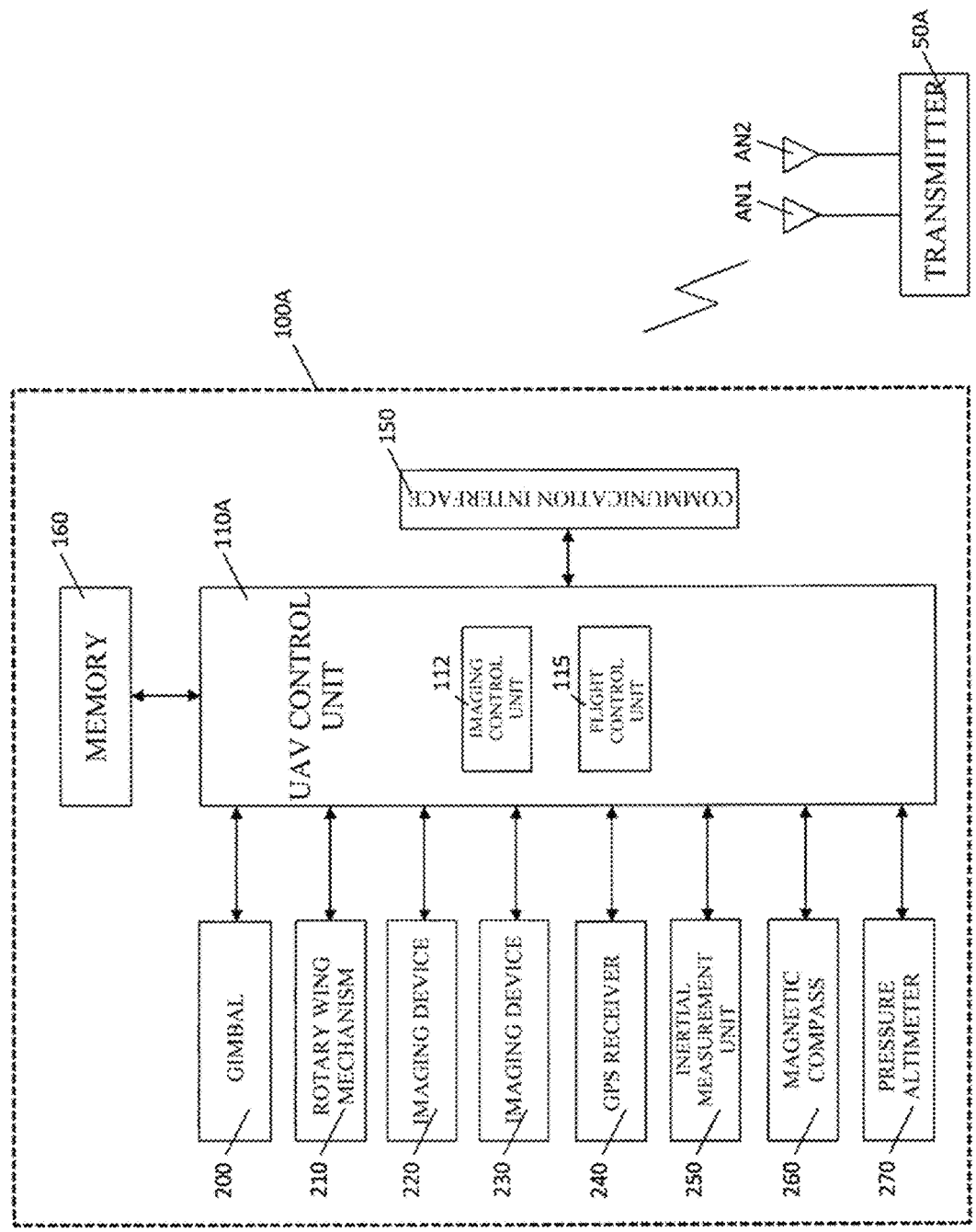
FIG. 23 is a block diagram showing an example of a hardware configuration of the unmanned aerial vehicle.

FIG. 23 is a block diagram showing an example of a hardware configuration of the unmanned aerial vehicle 100A. The unmanned aerial vehicle 100A includes a UAV control unit 110A instead of the UAV control unit 110 compared with the unmanned aerial vehicle 100. The UAV control unit 110A includes the imaging control unit 112 and the flight control unit 115, and does not include the flight route processing unit 111, shape data processing unit 113 and loss area detecting unit 114. In the unmanned aerial vehicle 100A shown in FIG. 23, the same components as those of the unmanned aerial vehicle 100 shown in FIG. 4 are denoted by the same reference numerals, and the descriptions thereof are omitted or simplified.

Next, an operation example of the three-dimensional shape estimation system 10A will be described.

In the three-dimensional shape estimation system 10A, the parameter operation unit OPA of the transmitter 50A input the input parameters. By using the input parameters, the flight route processing unit 65 decides imaging positions and generates a flight route (for example, the flight route FPA) passing through the imaging positions. The wireless communication unit 63 transmit the information on the imaging positions and the information on the flight route to the unmanned aerial vehicle 100A.

In the unmanned aerial vehicle 100A, the UAV control unit 110A acquires the information on the decided imaging positions and the information on the generated flight route by receiving from the transmitter 50A via the communication interface 150, and stores the information in the memory 160. The flight control unit 115 controls the flight according to the acquired flight route. The imaging control unit 112 controls the imaging device 220 or 230 to capture images (aerial photographing images) at the imaging positions (aerial photographing positions) (Waypoint) on the flight route. The communication interface 150 transmits the images to the transmitter 50A.

In the transmitter 50A, once the wireless communication unit 63 receives the images, the shape data processing unit 66 generates three-dimensional shape data based on the plurality of images. The loss area detecting unit 67 detects a loss area in the three-dimensional shape data. The flight route processing unit 65 generates a flight route comprising a flight section fpb or the flight route FPB for imaging the loss area. The wireless communication unit 63 transmits the information on the generated flight route and the information of the imaging positions on the flight route to the unmanned aerial vehicle 100A.

In the unmanned aerial vehicle 100A, the UAV control unit 110A acquires the information on the imaging positions and the information on the flight route by receiving from the transmitter 50A via the communication interface 150, and stores the information in the memory 160. The flight control unit 115 controls the flight according to the acquired flight route FPB or the flight route comprising the flight section fpb. The imaging control unit 112 controls the imaging device 220 or 230 to image in the horizontal direction toward the loss area on the side of the loss area on the flight route. The communication interface 150 transmits the images to the transmitter 50A.

In the transmitter 50A, once the wireless communication unit 63 receives the images, the shape data processing unit 66 generates, based on the plurality of images, three-dimensional shape data. Accordingly, the shape data processing unit 66 can generate three-dimensional shape data by using a plurality of images around the loss area.

Accordingly, the three-dimensional shape estimation system 10A and the transmitter 50A acquires a lot of images captured in the horizontal direction toward the loss area LA which can not be obtained simply by flying over the sky and aerial photographing while uniformly passing through a fixed route. Therefore, the three-dimensional shape estimation system 10A and the transmitter 50A can increase the number of the images used for three-dimensional restoration in the loss area LA, and can improve the restoration accuracy of the three-dimensional shape of the loss area LA.

The photographer does not have to grip the imaging device and manually capture images in order to image the loss area LA since the flight route FLB for imaging the loss area LA is generated and the unmanned aerial vehicle 100A captures images at each imaging position CP of the flight route FLB. Therefore, it is not necessary for a user who intends to capture images around the loss area LA to move to the periphery of the loss area LA and capture the images, thereby improving the user convenience. In addition, the possibility that the three-dimensional shape estimation system 10A and the transmitter 50A can acquire images in a desired state (for example, a desired imaging position of the subject, a desired imaging size of the subject, and a desired imaging direction of the subject) increases, and it is possible to reduce dispersion in images due to manual imaging.

In addition, it is possible to generate the imaging positions and the flight route for the transmitter 50A to capture images of the loss area LA without requiring user input of the three-dimensional spatial position (latitude, longitude and altitude) around the loss area LA, so that the user convenience is improved.

In some embodiments described above, the transmitter executes various processes (for example, the generation of the flight route, the detection of the loss area, and the generation of the three-dimensional shape data) for generating the three-dimensional shape data. In some other embodiments, it is illustrated that a communication terminal (for example, a PC) other than the transmitter executes the various processes for generating three-dimensional shape data.

Figure 24:
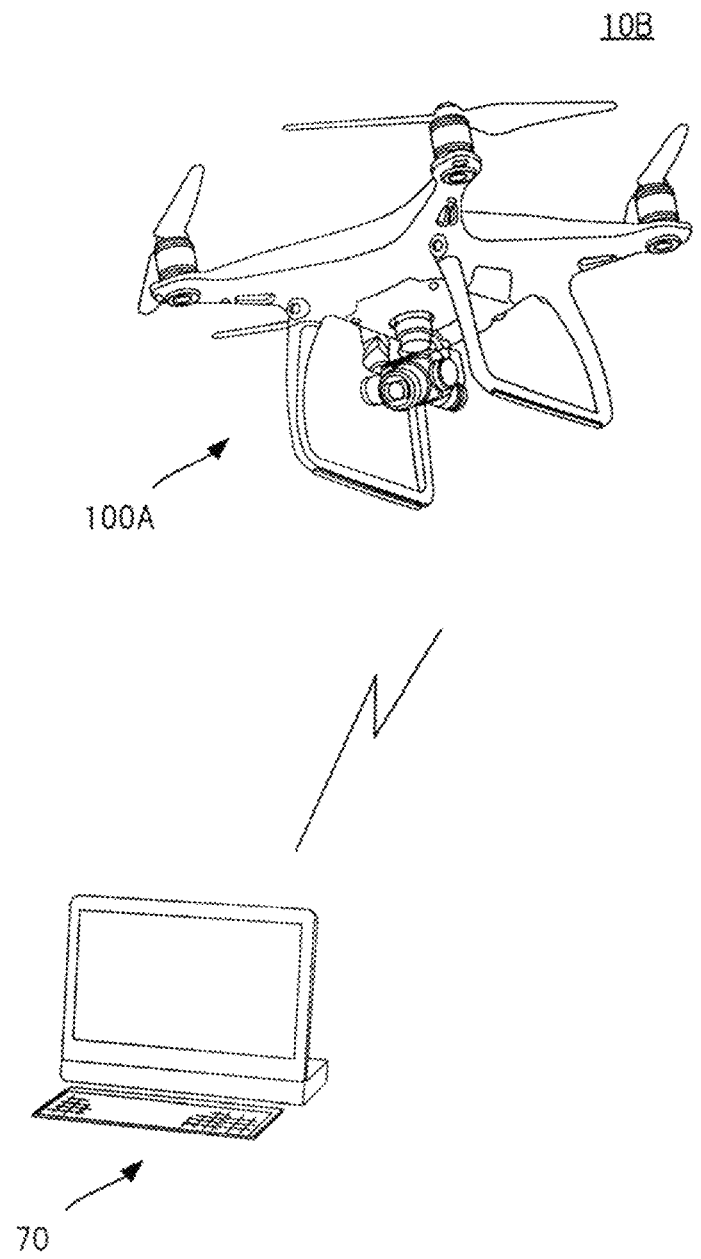
FIG. 24 is a pattern diagram showing a configuration example of a three-dimensional shape estimation system according to another embodiment.

FIG. 24 is a pattern diagram showing a configuration example of a three-dimensional shape estimation system 10B according to another embodiment. The three-dimensional shape estimation system 10B includes the unmanned aerial vehicle 100A and a PC 70. The unmanned aerial vehicles 100A and the PC 70 can communicate with each other by wired communication or wireless communication (for example, a wireless local area network (LAN), Bluetooth®).

The PC 70 may include a communication device, a memory, a processor, an input device, and a display. The PC 70 may have the functions of the parameter operation unit OPA, the flight route processing unit 65, the shape data processing unit 66 and the loss area detecting unit 67 which are included in the transmitter 50A described above. A program (application) for realizing the three-dimensional shape estimation method may be installed in the PC 70.

According to the three-dimensional shape estimation system 10B and the PC 70, it is possible to easily generate the estimation accuracy of the three-dimensional shape around the object which is likely to become a loss area by using the PC 70 with high versatility instead of using the transmitter 50A.

Although the present disclosure has been described using embodiments, the technical scope of the present disclosure is not limited to the scope described in the above-described embodiments. It is apparent to those skilled in the art that various modifications or improvements can be added to the above embodiments. It is also apparent from the description of claims that embodiments with such modifications or improvements can be included in the technical scope of the present disclosure.

The order of performing each processing such as an operation, a procedure, a step, and a stage in a device, a system, a program, and a method shown in the claims, the specification, and the drawings may be implemented in any order unless indicated by such as "before" and "prior to", or that the output of the previous processing is not used in the subsequent processing. Operation flows in the claims, the specification, and the drawings are described using "first", "next", and the like for the sake of convenience, but it does not mean that the flows are necessarily to be performed in this order.

In the embodiments described above, the unmanned aerial vehicle 100 is illustrated as a flying object, but it may also be an automatically flying manned aircraft on which a person boarded.

In the embodiments described above, the subject may be an object other than the object built on the ground, for example, may be an object built on the sea.

DESCRIPTION OF REFERENCE NUMERALS

10, 10A, 10B Three-dimensional shape estimation system
50, 50A Transmitter
50B Casing
53L Left control rod
53R Right control rod
61 Transmitter control unit
63 Wireless communication unit
64 Memory
65 Flight route processing unit
66 Shape data processing unit
67 Loss area detecting unit
70 PC
100, 100A Unmanned aerial vehicle
102 UAV Main body
110, 110A UAV Control unit
111 Flight route processing unit
112 Imaging control unit
113 Shape data processing unit
114 Loss area detecting unit
115 Flight control unit
150 Communication interface
160 Memory
200 Gimbal
210 Rotary wing mechanism
220, 230 Imaging device
240 GPS receiver
250 Inertial measurement unit
260 Magnetic compass
270 Pressure altimeter A1 Flight range
AN1, AN2 Antenna
B1 Power button
B2 RTH button
BL Building
CI, CI1, CI2, CI3, CI4 Image
CP Imaging position
DP Display unit
FPA, FPB, FPC Flight route
fpa, fpb Flight section
L1 Remote status display unit
L2 Battery remaining amount display unit
LA Loss area
M1 Map information
MT Mountain
OPA Parameter operation unit
OPS Operation unit set
SD, SD1, SD2, SD3, SD4 Three-dimensional shape data

What is claimed is:

1. A three-dimensional shape estimation method comprising:
generating, based on a plurality of first images captured by a movable object, a first set of three-dimensional shape data for a flight range of the movable object, the first images being captured while the movable object moves along a second flight route;
detecting, based on the first set of three-dimensional shape data for the flight range, a loss area;
generating a first flight route for imaging the loss area at different altitudes;
acquiring a plurality of second images, the plurality of second images being captured in a horizontal direction toward the loss area with imaging ranges partially overlapped while the movable object moves along the first flight route;
generating, based on the plurality of second images, a second set of three-dimensional shape data for the loss area;
generating, based on position information of the loss area, a third flight route by inserting the first flight route into the second flight route;
acquiring the plurality of first images in the vertical direction and the plurality of second images in the horizontal direction of the loss area in the third flight route;
generating, based on the first images and the second images, a third set of three-dimensional shape data for the flight range;
controlling the movable object to fly through the third flight route after flying through the second flight route;
imaging at a first imaging position interval on the second flight route; and
imaging at a second imaging position interval on the third flight route, the second imaging position interval being shorter than the first imaging position interval.

2. The three-dimensional shape estimation method of claim 1, wherein the plurality of first images are captured with imaging ranges overlapped partially while the movable object moves along the second flight route.

3. The three-dimensional shape estimation method of claim 2, wherein the second flight route is along a horizontal direction.

4. The three-dimensional shape estimation method of claim 1, further comprising:
synthesizing the first set of three-dimensional shape data for the flight range and the second set of three-dimensional shape data for the loss area to generate a fourth set of three-dimensional shape data.

5. A three-dimensional shape estimation method comprising:
generating, during flight of a movable object and based on a plurality of first images, a first set of three-dimensional shape data for a flight range of the movable object, the first images being captured while the movable object moves along a second flight route;
determining, during the flight, whether a loss area exists based on the first set of three-dimensional shape data for the flight range;
controlling the movable object to move toward the loss area in response to a determination that the loss area exists;
generating, during the flight, a first flight route for imaging the loss area at different altitudes;
controlling the movable object to capture a plurality of second images in a horizontal direction toward the loss area with imaging ranges partially overlapped, while controlling the movable object to move along the first flight route;
generating, based on the plurality of second images, a second set of three-dimensional shape data for the loss area;
returning the movable object to the flight following the second flight route after acquisition of the second images; and
acquiring the first images at imaging positions in the second flight route where no image has been previously captured.

6. The three-dimensional shape estimation method of claim 5, wherein the plurality of first images are captured with imaging ranges overlapped partially, while the movable object is being controlled to move along the second flight route.

7. The three-dimensional shape estimation method of claim 6, wherein the second flight route is along a horizontal direction.

8. The three-dimensional shape estimation method of claim 5, further comprising:
synthesizing, during the flight, the first set of three-dimensional shape data for the flight range and the second set of three-dimensional shape data for the loss area to generate a third set of three-dimensional shape data for the flight range.

9. A movable object comprising:
a main body; and
a processor coupled to the main body and configured to:
generate, based on a plurality of first images captured by the movable object, a first set of three-dimensional shape data for a flight range of the movable object, the first images being captured while the movable object moves along a second flight route;
detect, based on the first set of three-dimensional shape data for the flight range, a loss area;
generate a first flight route for imaging the loss area at different altitudes;
acquiring a plurality of second images, in a horizontal direction toward the loss area with imaging ranges partially overlapped, while the movable object moves along the first flight route;
generate, based on the plurality of second images, a second set of three-dimensional shape data for the loss area;

return the movable object to the flight following the second flight route after acquisition of the second images; and acquire the first images at imaging positions in the second flight route where no image has been previously captured.

10. A non-transitory computer-readable medium recording a program for causing a computer to:

generate, based on a plurality of first images captured by a movable object, a first set of three-dimensional shape data for a flight range of the movable object, the first images being captured while the movable object moves along a second flight route;

detect, based on the set of three-dimensional shape data for the flight range, a loss area;

generate a first flight route for imaging the loss area at different altitudes;

acquire a plurality of second images, the plurality of second images being captured in a horizontal direction toward the loss area with imaging ranges partially overlapped while the movable object moves along the first flight route;

generate, based on the plurality of second images, a second set of three-dimensional shape data for the loss area;

return the movable object to the flight following the second flight route after acquisition of the second images; and acquire the first images at imaging positions in the second flight route where no image has been previously captured.

* * * * *